(12) United States Patent
Gillick et al.

(10) Patent No.: US 7,467,087 B1
(45) Date of Patent: Dec. 16, 2008

(54) TRAINING AND USING PRONUNCIATION GUESSERS IN SPEECH RECOGNITION

(76) Inventors: Laurence S. Gillick, 55 Esty Farm Rd., Newton, MA (US) 02459; Steven A. Wegmann, 21 Mead St., Cambridge, MA (US) 02140; Jonathan P. Yamron, 511 Peakham Rd., Sudbury, MA (US) 01776

( * ) Notice: Subject to any disclaimer, the term of this patent is extended or adjusted under 35 U.S.C. 154(b) by 850 days.

(21) Appl. No.: 10/684,135

(22) Filed: Oct. 10, 2003

Related U.S. Application Data

(60) Provisional application No. 60/417,694, filed on Oct. 10, 2002.

(51) Int. Cl.
G10L 13/00 (2006.01)
G10L 15/00 (2006.01)
G10L 15/06 (2006.01)

(52) U.S. Cl. ............... 704/260; 704/235; 704/243
(58) Field of Classification Search ............... None
See application file for complete search history.

(56) References Cited

U.S. PATENT DOCUMENTS

| | | | |
|---|---|---|---|
| 5,715,367 A | 2/1998 | Gillick et al. | |
| 5,991,364 A * | 11/1999 | McAllister et al. | 379/88.01 |
| 6,029,132 A * | 2/2000 | Kuhn et al. | 704/260 |
| 6,230,131 B1 * | 5/2001 | Kuhn et al. | 704/260 |
| 6,260,012 B1 * | 7/2001 | Park | 704/236 |
| 6,411,932 B1 * | 6/2002 | Molnar et al. | 704/260 |
| 6,744,861 B1 * | 6/2004 | Pershan et al. | 379/88.03 |

OTHER PUBLICATIONS

Viikki et al., "Speaker and Language -Independent Speech Recognition in Mobile Communication Systems", 2001 IEEE International Conference on Acoustics, Speech, and Signal Processing, May 2001.*

"Sensory Introduces Voice Recognition S/W Solution for Embedded DSPs", http://www.sensoryinc.com/html/company/pr99_7.html, Aug. 1999.*

Issues in Building General Letter to Sound Rules, by Alan Black, Kevin Lenzo, and Vincent Pagel 1998.

Weighted Entropy Training for Decision Tree Based Text-To-Phoneme Mapping, by Jilei Tian, Janne Suontausta, and Juha Hakkinen, 2003.

Decision Tree Based Text-To-Phoneme Mapping for Speech Recognition, by Janne Suontausta and Juha Hakkinen 2000.

Statement By Edward Porter Regarding Possible Prior Art of May 20, 2008.

\* cited by examiner

*Primary Examiner*—David R. Hudspeth
*Assistant Examiner*—Samuel G Neway
(74) *Attorney, Agent, or Firm*—Edward W. Porter

(57) ABSTRACT

The error rate of a pronunciation guesser that guesses the phonetic spelling of words used in speech recognition is improved by causing its training to weigh letter-to-phoneme mappings used as data in such training as a function of the frequency of the words in which such mappings occur. Preferably the ratio of the weight to word frequency increases as word frequencies decreases. Acoustic phoneme models for use in speech recognition with phonetic spellings generated by a pronunciation guesser that makes errors are trained against word models whose phonetic spellings have been generated by a pronunciation guesser that makes similar errors. As a result, the acoustic models represent blends of phoneme sounds that reflect the spelling errors made by the pronunciation guessers. Speech recognition enabled systems are made by storing in them both a pronunciation guesser and a corresponding set of such blended acoustic models.

50 Claims, 26 Drawing Sheets

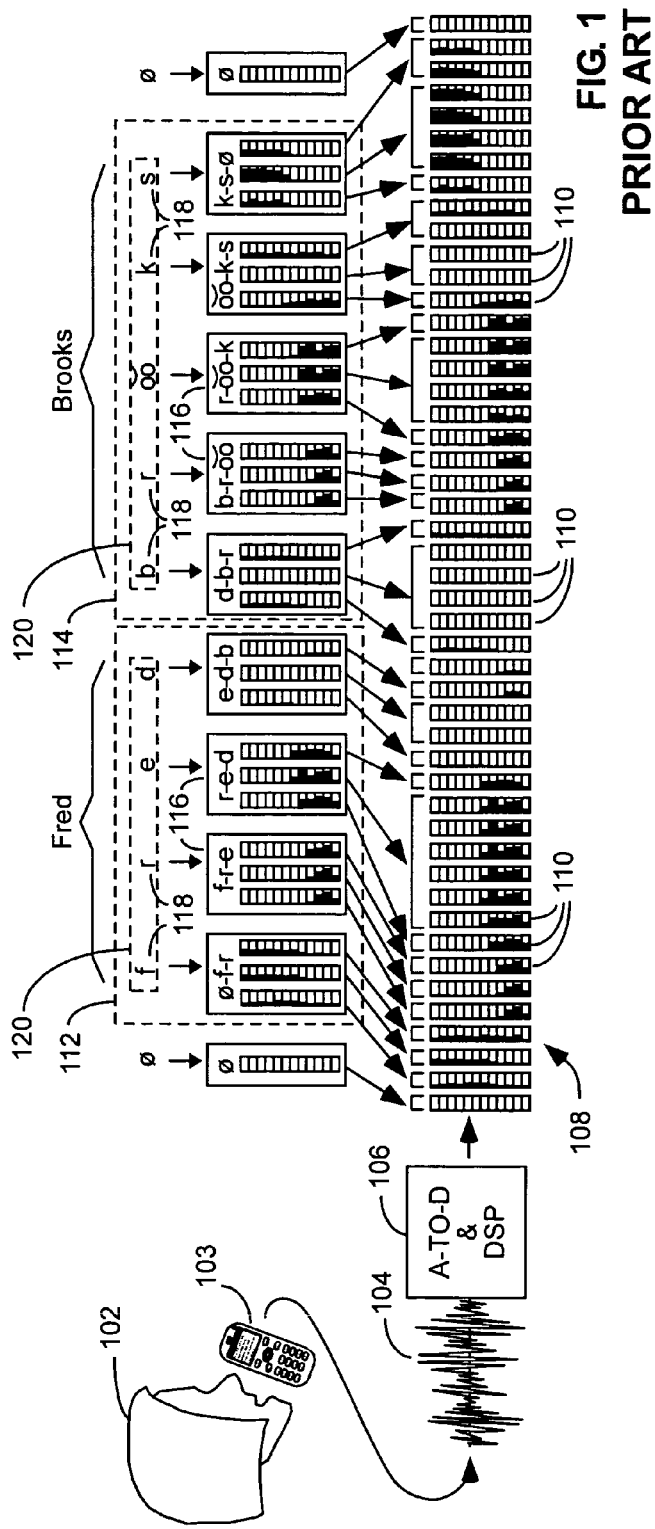
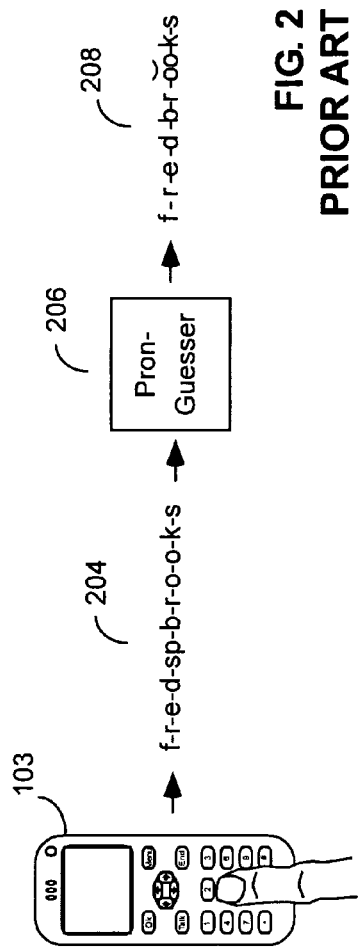
FIG. 1
PRIOR ART
FIG. 2
PRIOR ART

-Training pron-guesser~302
    -for each of a set of pron-guesser training words, obtaining ~402
        -a textual spelling for the word~404
        -a phonetic spelling for the word~406
        -frequency with which the word occurs~408
    -for each training word~410
        -map letters of word's textual spelling against phonemes of the phonetic spelling for the word~412
        -for each letter in the word~414
            -create an associated letter context that contains~416
                -the letter~418
                -the phoneme it is mapped to in the word~420
                -the context of letters, if any, that occur near the letter in the word~422
                -a frequency weight calculated as a function of the frequency of the word raised to a power less than one~424
    -bin together all occurrences of identical letter contexts from all the trainging words~426
    -for each set of identical letter contexts~428
        -create a summed frequency weight equal to the sum of all the frequency weights from all letter context in set~430
    -for each letter~432
        -call a pronGuesserDTreeTraining for the set of letter contexts created for the letter, with its summed frequency weight~434

FIG. 4

| FREQ. | WEIGHT | TEXT SPELLING | PHONETIC SPELLING |
|---|---|---|---|
| 683 | 96 | Josette | jh ow s eh t |
| ... | ... | ... | ... |
| 320 | 57 | Swanton | s w aa n t ax n |
| ... | ... | ... | ... |
| 155 | 34 | Fontenette | f aa n t ax n eh t |
| ... | ... | ... | ... |
| 33 | 12 | Parsonage | p aa r s ax n ax jh |
| ... | ... | ... | ... |

FIG. 5

-pronGuesserDTreeTraining~800
    -call processD-TreeNode with~802
        -currentNode equal to the d-tree's root node~804
        -currentContextSet equal to the set of contexts supplied to the d-tree's root~806

FIG. 8

-processDTreeNode (currentContextSet, currentNode)~900
    -for each possible context question~902
        -divide the current context set into two new context sets, one of contexts that satisfy the question and one of contexts that do not~904
        -for each of the two new context sets~906
            -calculate the entropy of the context set based on the distribution phonemes associated with the contexts of the set, weighting the contribution of each context's phoneme to the distribution as a function of the context's associated frequency based weight~900
        -if this total entropy for the two new context sets is the lowest calculated so far for the current node~908
            -save the entropy value as minEntropy~910
            -save the current context question as bestQuestion~912
            -save the two new context sets~914
    -if the difference between the entropy of the currentContextSet and minEntropy is not greater than a given amount~916
        -make the new node a terminal node~918
        -set the outputPhoneme for the terminal node equal to the phoneme associated with the largest number contexts in the node's context set~920
    -else~921
        -created a new node for each of the two new context sets~922
        -for each of two new nodes~924
            -if the number of contexts in the new node's context set is above a given number~926
                -call processDTreeNode with~928
                    -currentNode equal to new node~930
                    -currentContextSet equal to the new node's context set~932
            -else~934
                -make the new node a terminal node~936
                -set the outputPhoneme for the terminal node equal to the phoneme associated with the largest number contexts in the node's context set~938

FIG. 9

-pron-guessing programming~1100
    -for each successive letter in the spelling of the word for which phonetic spelling is to be produced~1106
        -create a mapping context of the type used in training the pron-guesser's d-trees for the letter~1108
        -send the letter context through the d-tree corresponding to the given letter~1110
        -add the output phoneme associated with the end node of the d-tree into which the letter context is mapped to the phonetic spelling being created for the name~1112

FIG. 11

Correct pronunciations:
```
Cheryl    sh eh r ax l
Igor      iy g ao r
Jose      hh ow z ey
Philippe  f ih l iy p
Rene      r ax n ey
```

Incorrect guessed pronunciations:
```
Cheryl    ch eh r ax l    (starts with "ch" sound instead of "sh")
Igor      iy g ax r       (pronounced as "eager")
Jose      jh ow z ey      (starts with "j" sound instead of "h")
Philippe  f ih l ih p     (pronounced as "Philip")
Rene      r ax n          (final "e" is dropped)
```

FIG. 12

```
aa    sound of "o"  in "pot"
ae    sound of "a"  in "at"
ah    sound of "u"  in "but"
ax    sound of "a"  in "about" (schwa)
ay    sound of "i"  in "night"
b     sound of "b"  in "boy"
ch    sound of "ch" in "children"
d     sound of "d"  in "day"
eh    sound of "e"  in "bet"
ey    sound of "a"  in "fake"
f     sound of "f"  in "food"
hh    sound of "h"  in "hey"
ih    sound of "i"  in "bit"
iy    sound of "ee" in "bee"
jh    sound of "j"  in "judge"
l     sound of "l"  in "light"
m     sound of "m"  in "may"
n     sound of "n"  in "new"
ow    sound of "o"  in "no"
p     sound of "p"  in "pay"
r     sound of "r"  in "ray"
s     sound of "s"  in "so"
sh    sound of "sh" in "shame"
t     sound of "t"  in "time"
uh    sound of "oo" in "hood"
v     sound of "v"  in "very"
w     sound of "w"  in "will"
y     sound of "y"  in "yes"
z     sound of "z"  in "zoo"
zh    sound of "si" in "Asia"
```

FIG. 13

| error % | % of errors | Pho-neme | | | | | | | | | | | | |
|---|---|---|---|---|---|---|---|---|---|---|---|---|---|---|
| 6.3 | 6.3 | eh | -> | eh | ax | iy | Ins | ey | ae | ih | aa | ay | sh | |
| | | | | 5430 | 201 | 86 | 26 | 17 | 13 | 13 | 6 | 1 | 1 | |
| | | | | 93.72% | 3.47% | 1.48% | 0.45% | 0.29% | 0.22% | 0.22% | 0.10% | 0.02% | 0.02% | |
| | | 5794 | -> | | | | | | | | | | | |
| 6.7 | 1.1 | y | -> | y | Ins | iy | | | | | | | | |
| | | 969 | -> | 904 | 42 | 7 | | | | | | | | |
| | | 100.00% | -> | 93.29% | 4.33% | 0.72% | | | | | | | | |
| 7.3 | 22.1 | ax | -> | ax | ah | aa | | ay | g | ax | ey | zh | | |
| | | 17460 | -> | 16188 | 272 | 218 | 5 | 4 | 4 | 1 | 1 | 1 | | |
| | | 100.00% | -> | 92.71% | 1.56% | 1.25% | 0.52% | 0.41% | 0.41% | 0.10% | 0.10% | 0.10% | | |
| 7.6 | 3.1 | ey | -> | ey | ae | ih | eh | ae | ih | ey | eh | ey | ao | |
| | | 2359 | -> | 2181 | 61 | 17 | 206 | 184 | 155 | 90 | 1 | 1 | 17 | |
| | | 100.00% | -> | 92.45% | 2.59% | 0.72% | 1.18% | 1.05% | 0.89% | 0.52% | 0.05% | 0.10% | 0.10% | |
| 8.8 | 2.9 | ay | -> | ay | iy | ih | iy | ay | ay | eh | Ins | ih | | |
| | | 1894 | -> | 1727 | 83 | 72 | 17 | 11 | 9 | 9 | 1 | 1 | | |
| | | 100.00% | -> | 91.18% | 4.38% | 3.80% | 0.72% | 0.47% | 0.38% | 0.38% | 0.05% | 0.04% | | |
| 10.8 | 9.2 | ae | -> | ae | ax | ey | eh | ax | y | zh | uw | | | |
| | | 4912 | -> | 4381 | 317 | 60 | 5 | 2 | 2 | 2 | 2 | | | |
| | | 100.00% | -> | 89.19% | 6.45% | 1.22% | 0.26% | 0.11% | 0.11% | 0.11% | 0.08% | | | |
| 14.7 | 0.1 | zh | -> | zh | iy | s | | ao | eh | Ins | Ins | | | |
| | | 34 | -> | 29 | 4 | 1 | | | | | | | | |
| | | 100.00% | -> | 85.29% | 11.76% | 2.94% | | | | | | | | |
| 29.8 | 14.9 | ah | -> | ah | ax | uw | Ins | ow | aa | ao | eh | ey | uh | y |
| | | 2876 | -> | 2018 | 810 | 29 | 8 | 3 | 2 | 2 | 1 | 1 | 1 | 1 |
| | | 100.00% | -> | 70.17% | 28.16% | 1.01% | 0.28% | 0.10% | 0.07% | 0.07% | 0.03% | 0.03% | 0.03% | 0.03% |

FIG. 15

-training blended acoustic phoneme models~1600
    -for each of a plurality of acoustic training words~dd02
        -have errorful pron-guessing programming generate a phonetic spelling for word~dd04
        -create an untrained associate word model for the word, composed of a sequence of untrained acoustic phoneme models corresponding to the word's phonetic spelling~dd06
    -repeatedly~dd08
        -use HMM to map one or more utterances of each training word against the acoustic model for that word~dd10
        -alter each acoustic phoneme model to be more like the utterance sounds mapped against it in all training words in which it occurs~dd12
    -for each phoneme~dd14
        -for each node number n = 1 through 3~dd16
            -call acoustic node clustering d-tree algorithm for the nth node of the set of all triphone model for the given phoneme~dd18

FIG. 16

-creating list of common phonetically-mispelled names~306
    -for each of a set of common names~2502
        -compare guessed phonetic spelling produced by recognition pron-guessers with known phonetic spellings for name~2504
        -if the guessed phonetic spelling is wrong, mark word as phonetically misspelled~2506
    -for each of a given number of the most common of the names marked as phonetically misspelled~2508
        -add to the list of common phonetically misspelled names~2510
            -the spelling of the name~2512
            -the correct phonetic spelling of the name~2514

FIG. 25

-cell phone control programming~334
    -...
        -if user selects phone contact entry mode~2802
            -call name entry routine to enable user to enter name~2804
            -if user enters a spelling of a name~2806
                -create a blank phone contact record~2808
                -enter spelling of name in name field of record~2810
                -if spelling is one for which a correct phonetic spelling has been stored~2812
                    -place correct phonetic spelling in phonetic spelling field of record~2814
                -else~2815
                    -call pron-guesser for name~2816
                    -place phonetic spelling generated by pron-guesser in phonetic spelling field for record~2818
            -call phone number entry routine to enable user to enter phone number~2820
            -...
            -if user enters a phone number~2822
                -place entered phone number in phone number field of record~2824
            -...
        -...   } 2716

-...
        -if user selects voice dial~2826
            -call the speech recognition programming with a vocabulary corresponding the names and corresponding phonetic spellings, whether guess or known correct, in the contact records and one or more command words and their known correct spellings~2828
            -if best match is a name in a contact record~2830
                -if there is a phone number stored in the contact record~2832
                    -use text-to-speech synthesizer to generate sound of recognized name using its phonetic spelling~2833
                    -dial that number~2834
            -else if best match is a command~2836
                -call subroutine associated with the given command~2838   } 2718

-...
        -if in command recognition mode~2840
            -call the speech recognition programming with a vocabulary corresponding to the commands recognizable in the command mode~2842
            -if best match is a given command~2844
                -call subroutine associated with the given command~2846   } 2720

FIG. 28

-speech recognition programming~342
    -if detect an utterance~2902
        -score the match between sounds of the utterance and the sequence of blended acoustic phoneme models corresponding with the phonetic spelling of each word in the vocabulary for which the recognition program has been called~2906
        -return with an indication of one or more words having the best score in the match~2908

FIG. 29

-training pure acoustic phoneme models~1600A
  -for each of a plurality of acoustic training words~1602
    -OBTAIN A CORRECT PHONETIC SPELLING FOR THE WORD~1604A
    -create an untrained associate word model for the word, composed of a sequence of untrained acoustic phoneme models corresponding to the word's phonetic spelling~1606
  -repeatedly~1608
    -use HMM to map one or more utterances of each training word against the acoustic model for that word~1610
    -alter each acoustic phoneme model to be more like the utterance sounds mapped against it in all training words in which it occurs~1612

FIG. 31

-training segregated blended models~3200
  -for each phoneme~3202
    -create an empty mapping list for the phoneme~3204
  -for each of a plurality of acoustic training words~3206
    -have pron-guesser guess phonetic spelling for the word~3208
    -map phonemes of guessed phonetic spelling for word against correct phonetic spelling for word~3210
    -for each guessed phoneme in guessed phonetic spelling~3212
      -find the sequence of one or more correct phonemes mapped against the guessed phoneme~3214
      -if the sequence mapped against the guessed phoneme does not already have an entry in the guessed phoneme's mapping list~3216
        -create an entry in that mapping list for the sequence of one or more correct phonemes and set its count to one~3218
      -else~3220
        -increment the count of the entry in the guessed phoneme's mapping list corresponding to the sequence of one or more correct phonemes~3222
  -for each phoneme~3224
    -normalize the count of its mapping list, so that the total of the count associated with all phonemes in the list equals one~3226

FIG. 32

-adapting pure acoustic models~3300
    -prompt user to say utterances of one or more adaptation training words~3302
    -map utterances of each adaptation training word against a sequence of pure acoustic phoneme models corresponding to a correct phonetic spelling of that word~3304
    -use the sounds mapped against each pure acoustic phoneme models to adapt that model~3306
    -for each given phoneme~3308
        -create an empty blended acoustic phoneme model for the given phoneme~3310
        -for each phoneme listed in the given phoneme's mapping list having a count above a certain value~3312
            -multiply the pure model of the listed phoneme by the listed phoneme's count in the mapping list~3314
            -add the resulting product to blended acoustic phoneme model for the given phoneme~3316

FIG. 33

-speech recognizing against segregated acoustic models~342A
    -if detect an utterance~2902
        -score the match between sounds of the utterance and the sequence of SEGREGATED blended acoustic phoneme models corresponding with the phonetic spelling of each word of the vocabulary for which the recognition program has been called~2906A
        -return with an indication of one or more words having the best score in the match~2908

FIG. 34

TRAINING AND USING PRONUNCIATION GUESSERS IN SPEECH RECOGNITION

RELATED APPLICATION

The present application claims the priority of U.S. Provisional Patent application No. 60/417,694, which was filed on Oct. 10, 2002 by Daniel L. Roth, Laurence S. Gillick, Steven A. Wegmann, and Jonathan P. Yamron. This provisional applications was titled "Apparatus, Methods, And Programming For Training Models Using Systematically Flawed Intermediate Representations And For Training Pronunciation Guessing Models By Weighting More Common Words More Heavily."

FIELD OF THE INVENTION

The present invention relates to apparatus, methods, and programming for training and using a pronunciation guesser in conjunction with speech recognition.

BACKGROUND OF THE INVENTION

Speech recognition systems commonly recognize utterances by comparing the sequences of sounds associated with an utterance against acoustic models of different words. In many such systems, an acoustic word model is represented by a sequence of acoustic phoneme models corresponding to the phonetic spelling of the word.

This is illustrated in FIG. 1 in which speech sounds generated by user 102 are converted into an analog electrical signal 104. The analog electrical representation is converted by analog-to-digital and DSP circuitry 106 into a sequence 108 of acoustic parameter frames 110. Each parameter frame represents the value of each of a set of acoustic parameters of the utterance during a given time period, such as a fiftieth or a hundredth of a second. The parameters can include spectral or cepstral parameters of the frame's associated sound or parameters based on derivatives of such parameters.

This representation of the user's utterance is compared against each of a plurality of acoustic word models such as the acoustic word models 112 and 114, corresponding to the name "Fred" and "Brooks", respectively, in FIG. 1. Each such word model is comprised of a sequence of acoustic phoneme models 116 corresponding to the sequence of individual phonemes 118 contained within the phonetic spelling 120 associated with each such word model.

In the example of FIG. 1, the acoustic phoneme models 116 are triphone models, each of which represents its phoneme as a sequence of three acoustic parameter models that represent the sequence of sounds associated with the phoneme when it occurs in the context of a given preceding and given following phoneme.

We use the word "phoneme" to represent a class of speech sounds, each represented by a symbol, where each of multiple letters of the text alphabet correspond to different phonemes in different words. This definition includes the sets of phonemes found in the phonetic word spellings of common dictionaries, but is not limited to such phoneme sets. This is because different linguists use different sets of phonemes to classify speech sounds; because speech recognition systems with access to different levels of computational and storage resources often use phoneme sets of different size, and because the classification of speech sounds most useful for a given speech recognition system might not be one most useful for humans trying to understand how to pronounce words.

In many speech recognition systems the phonetic spellings for all, or most, of the words the system can recognize have been provided as a fixed part of the system. In most current systems such pre-stored phonetic spellings have been obtained from a dictionary or other relatively reliable sources. However, it is often desirable for a speech recognition system be able to recognize words for which there is no pre-stored spelling.

For example, one context in which it is desirable to enable a user to add words to the recognition vocabulary is in cell phones that enable a user to voice dial, that is, to dial a person by speaking his or her name. Because there are a very large number of possible names for people (there are roughly two million different names in US phonebooks), and because most cell phone speech recognition systems have small vocabularies to enable them to fit into the relatively small memories of cellphones, it is currently impractical to include the phonetic spellings of all names in most voice dial cellphone.

The prior art has traditionally dealt with the problem of enabling a speech recognition system to recognize words that have been entered into them by using a pronunciation guesser. This is normally a computer program that models the rules for pronouncing names from their text spellings.

Algorithms used for pronunciation guessing can include algorithms ranging all the way from the very sophisticated to the very simple. For example, relatively sophisticated pronunciation guessing algorithms can include learning techniques such as hidden-markov-modeling or decision tree classifiers to develop statistical models of which phonemes or sequences of phonemes tend to be associated with which letters and sequences of letters.

In this application when we refer to a pronunciation guesser or a guessed pronunciation we intend to cover all such algorithms.

Because of the vagaries of language, some of the pronunciations predicted by a pronunciation algorithm will be incorrect. The association of an incorrect phonetic spelling with a word normally will reduce the chance that such word will be correctly recognized. This is because the acoustic model of the word, being based on an incorrect phonetic spelling, corresponds to a sequence of sounds different than the pronunciation of the word users are likely to actually say when seeking to have the word recognized.

The guessing of the pronunciation of people's names tends to be particularly difficult. This is in part because there are so many different names. As stated above, there are approximately two million names in US phonebooks. It is also because the pronunciation of names tends to be more irregular than the pronunciation of average words. Incorrect pronunciations of names exist because language styles shift and names change pronunciation over time; different dialects can have different pronunciations for the same text representation of a name; people with accents will not offer the same pronunciations as people with native fluency; foreign names may be pronounced inconsistently as the native speakers may not understand how to pronounce foreign names, and the same foreign name is often imported into English by different people using different rules from converting from their native language.

It has been standard practice to train acoustic phoneme models used in name recognition based on the phonetic spellings of a large number of words and/or names, with either a single or multiple pronunciations for each word. Some such system train acoustic models using both correct and known commonly mis-pronounced utterances of words.

A known common mis-pronunciation of a given word can be viewed, for purposes of speech recognition as a correct pronunciation, since it is a pronunciation that is commonly used by people to represent the given word. Thus, in this application and the claims that follow, we consider a known common mis-pronunciation of a word or name to be a correct pronunciation, and when we refer to incorrect pronunciations or phonetic spellings of words we mean to exclude known common mispronunciations of words.

It is possible that some recognition systems in the past may have trained acoustic data with phonetic spellings generated by pronunciation guessers in situations in which such a pronunciation guesser could achieve a low enough error rate that the effect of phonetic misspellings on the acoustic models trained would be minimal. Such a situation could have occurred in the training of acoustic models for US English words if the pronunciation guesser used was unusually accurate. It might also have occurred if the acoustic models being trained were for words of a language in which the letter-to-phoneme rules were highly regular, such as in Spanish, in which a relatively simple pronunciation guesser would be able to achieve surprisingly high degree of accuracy.

SUMMARY OF THE INVENTION

According to a first aspect of the invention a method is provided for training acoustic models for use in phonetically spelled word models. This method uses a training pronunciation guesser to generate a phonetic spelling from the text spelling of each of a set of acoustic training words. The method maps sequences of sound associated with utterances of each of the training words against the sequence of phonemes defined by the phonetic spelling generated by the pronunciation guesser for each training word. For each phonemes used in such phonetic spellings, the method uses the sounds mapped against the phoneme in such phonetic spellings to develop at least one acoustic phoneme model for the given phoneme.

In some embodiments of this first aspect of the invention the acoustic phoneme models generated are used in speech recognition performed against acoustic word models, where the word model of a given word is composed of a sequence of the acoustic phoneme models corresponding to a phonetic spelling generated for the word by a recognition pronunciation guesser.

In some embodiments of this first aspect of the invention the training pronunciation guesser is an errorful pronunciation guesser in which 5% or more of the occurrences of vowel phonemes placed in the phonetic spellings of the acoustic training words by the training pronunciation guesser are phonetic spelling errors. In some such embodiments the acoustic phoneme models generated are used in speech recognition performed against acoustic word models having phonetic spellings generated by an errorful recognition pronunciation guesser, which would make 50% or more of the same phonetic spelling errors as are made by the training pronunciation guesser in the acoustic training words if it were to generate phonetic spellings for the same set of acoustic training words. The recognition and acoustic training pronunciation guessers can be the same pronunciation guesser. The words whose guessed phonetic spellings are used in the speech recognition can be peoples' names. For example, such names can be used in a voice name dialing application on a cellphone. This is an application were a relatively small, and thus relatively errorful, pronunciation guesser would often be used because of the relatively small amount of memory normally available for such applications on a cellphone or other phone.

Such cellphone embodiments might also store on the cellphone a phonetic spelling for each of a plurality of commands that can be evoked by voice recognition, where the phonetic spellings of such commands come from a source more reliable then the errorful recognition pronunciation guesser.

In embodiments involving voice dialing, the method can further include responding to a user's entry of a name by having the recognition pronunciation guesser generate a phonetic spelling for the user-entered name and then using the phonetic spelling of the user-entered name in the speech recognition. In some such embodiments the method further includes testing, for each of a plurality of common names, if the phonetic spelling produced for the name by the recognition pronunciation guesser is correct and, for common names for which correct phonetic spellings are not generated, storing on the cellphone phonetic spellings of such names that come from a source more accurate than the recognition pronunciation guesser. Some such embodiments respond to the entry of a name by a user by checking to see if the name is one for which a phonetic spelling from the more accurate source has been stored. If so, it uses the more reliable spelling as the phonetic spelling for the user-entered word in speech recognition. If not, it uses the recognition pronunciation guesser to generate the phonetic spelling of the word and uses that generated spelling in speech recognition.

In some embodiments of the first aspect of the invention the training and/or recognition pronunciation guesser can be trained by the following procedure to reduce the frequency of phonetic spelling errors it makes on the words it is likely to be asked to guess pronunciations for. The following data for each of a plurality of the pronunciation-guesser training words is obtained: a textual spelling for the word; a relatively reliable phonetic spelling for the word; and a measure of the frequency with which the word occurs. The data obtained for each of the pronunciation-guesser training words is used to train the pronunciation guesser. This includes mapping the sequence of letters of the each training word's textual spelling against the sequence of phonemes of the relatively reliable phonetic spelling and using the resulting letter-to-phoneme mappings to train the pronunciation guesser. The using of the letter-to-phoneme mappings includes varying the weight given to a given letter-to-phoneme mapping in the training of the pronunciation guesser as a function of the frequency measure of the word in which such a mapping occurs. In some such embodiments the ratio of the weight given to a letter-to-phoneme mapping relative to the frequency of the given word in which the mapping occurs decreases as the frequency of the given word increases.

In some embodiments of the first aspect of the invention the majority of the acoustic phoneme models are multiphone models, such as triphone models, each of which represents the sound of a given phoneme when it occurs in a given phonetic spelling context defined by one or more phonemes occurring before or after the given phoneme in a phonetic spelling. In other embodiments a majority of the acoustic phoneme models are monophone models in which a given acoustic model represents the sounds of a given phoneme in a phonetic context corresponding to all possible situations in which the phoneme can occur in the phonetic spellings.

In some embodiments of the first aspect of the invention the acoustic training words are English words. In some embodiments the pronunciation guesser is trained on a representative distribution of names from US phone books and thus is large enough to capture the national and ethnic diversity of such names. For example, in one embodiment the pronunciation guesser is trained on two-hundred thousand of the most common names from US phone books. This is a sample that is sufficiently large as to captures names that come from many different backgrounds In some embodiments where the pronunciation guesser is trained on such a distribution of US names, the pronunciation guesser is sufficiently errorful that 5% or more of the occurrences of vowel phonemes that the training pronunciation guesser would placed in the phonetic spellings of such a set of pronunciation guesser training words, if generating their phonetic spellings, would be phonetic spelling errors.

According to a second aspect of the invention a method is provided for making a speech recognition enabled computing system. This method includes training a set of acoustic phoneme models and storing certain data and programming in the machine readable memory of the computing system being created.

The training uses a training pronunciation guesser to generate a phonetic spelling from the text spelling of each of a set of acoustic training words. The training further maps sequences of sounds associated with one or more utterances of each of the training words against the sequence of phonemes defined by the phonetic spelling associated with the training word. The training then uses the sounds mapped against each of a plurality of phonemes in one or more of the phonetic spellings to develop at least one acoustic phoneme model for the phoneme.

The data and programming stored in the computing system's machine readable memory includes recognition pronunciation guessing programming for generating a phonetic spelling from a textual spelling of a word. It also includes the set of acoustic phoneme models generated by the training, including at least one for modeling the speech sounds associated with each phoneme used in the phonetic spellings generated by the recognition pronunciation guessing programming. The programming stored also includes speech recognition programming for recognizing an utterance by scoring the match between a sequence of the utterance's speech sounds and a sequence of the acoustic phoneme models associated with the phonetic spelling of each of a plurality of words. The programming stored further includes programming that enables the speech recognition programming to perform recognition against a sequence of the acoustic phoneme models associated with a phonetic spelling generated by the pronunciation guessing programming.

In this method of making a speech enabled computing system 5% or more of the occurrences of vowel phonemes placed in the phonetic spellings of the acoustic training words by the training pronunciation guesser are phonetic spelling errors and the recognition pronunciation guessing programming would make 50% or more of same phonetic spelling errors as made by the training pronunciation guesser when generating phonetic spellings for the same set of acoustic training words.

In some embodiments of the method for making a speech enabled computing system additional programming is stored in the system's memory. This includes programming for enabling a user to enter the text spelling of a name into the system in association with an item upon which the system can perform a given function; for responding to such a user's entry of a name into the system by causing the pronunciation guessing programming to generate a phonetic spelling from the text spelling of the entered name; for responding to a user's utterance by having the speech recognition programming score the match between the sound of the utterance and sequences of the acoustic phoneme models corresponding to the phonetic spellings generated by the pronunciation guessing programming for one or more user entered names; and for determining whether to perform the given function on the item associated with a given user-entered name as a function of the score produced by the speech recognition programming for the utterance against the phonetic spelling of the given user-entered name.

In some such embodiments, including those in which the computing system is a cellphone, the item associated with a user-entered name includes a phone number and the given function is the dialing of the phone number associated with a user-entered name selected as a function of the score produced by the speech recognition programming. In other embodiments the item can include music or video selections or computer functions that can be selected by voice recognition of a name a user has associated with them. In some embodiments the item can be a selection of text that a user might wish to include in a text he is creating or editing. This could include, for example, a text that can be sent wirelessly by a mobile computing device or cellphone. In such an embodiment, voice recognition of user entered names could be used by different parts of the programming both to select who to send such a message to, as well as which pieces of selected text to include in the message.

Some embodiments that enable the selection of an item by voice further include storing in the machine readable memory correct phonetic spellings for a plurality of names the recognition pronunciation guessing programming phonetically misspells. In such embodiments the programming for responding to a user's entry of a name includes programming for responding to the user's entry of a given name for which a correct phonetic spelling has been stored by causing the correct phonetic spelling to be used as the phonetic spelling for the given user-entered name in speech recognition instead of a phonetic spelling generated by the recognition pronunciation guessing programming. In some such embodiments the speech recognition programming uses the same acoustic phoneme models for a given phoneme in a given phonetic context in the correct phonetic spellings as it uses for the same phoneme in the same phonetic context in phonetic spellings generated by the pronunciation guessing programming.

Some embodiments of the method enabling the selection of an item by voice, further include storing in the machine readable memory a correct phonetic spelling for each of a plurality of commands; command recognition programming for causing the speech recognition programming to perform recognition of utterances against sequences of the acoustic phoneme models corresponding to the stored correct phonetic spellings of the commands; and programming for determining whether to perform a given command as a function of the score produced by the speech recognition programming of a given utterance against the correct phonetic spelling of the given command.

According to a third aspect of the invention a speech recognition system comprises a pronunciation guesser for generating a phonetic spelling from a text spelling of a word. It also includes a machine readable memory storing a set of acoustic phoneme models, including at least one for modeling the speech sounds associated with each phoneme used in the phonetic spellings generated by the pronunciation guesser. The system further includes a speech recognizer for recognizing an utterance by scoring the match between a sequence of the utterance's speech sounds and a sequence of the acoustic phoneme models associated with the phonetic spelling of each of a plurality of word models. It also includes circuitry for enabling the speech recognizer to perform recognition against phonetic spellings generated by the pronunciation guesser. Each of the acoustic models represents a phoneme in a phonetic context. Each of a plurality of the acoustic models is a blended acoustic model that represents a given phoneme in a given phonetic context as a distribution of sounds corresponding to utterances of the given phoneme and utterances of an associated set of one or more other phonemes. Over the plurality of blended acoustic models the relative weight allocated, in an acoustic model of a given phoneme in a given phonetic context, between sounds of utterances of the given phoneme and each of its associated phonemes varies as a function of the frequency with which the pronunciation guesser places the given phoneme in a position in a phonetic spelling in the given phonetic context where the correct phoneme for the position is, respectively, the given phoneme and each of said associated phonemes.

Some embodiments of this third aspect of the invention further include circuitry for enabling a user to enter the textual spelling of a word into the system; for responding to a user's entry of a word into the system by causing the pronunciation guesser to generate a phonetic spelling of the entered word; and for responding to a user's utterance by having the speech recognizer score the match between the sound of the utterance and sequences of acoustic models corresponding to the phonetic spellings generated by the pronunciation guessing programming for each of one or more user entered words.

In some such embodiments the machine readable memory further stores correct phonetic spellings for a plurality of words the pronunciation guesser phonetically misspells; and the system responds to the user's entry of a given word for which a correct phonetic spelling has been stored by causing the correct phonetic spelling to be used as the phonetic spelling for the given user-entered word in the matching performed by the speech recognizer. In some such embodiments, the speech recognizer uses the same blended acoustic phoneme models for a given phoneme in a given phonetic context in the correct phonetic spellings as it uses for the same phoneme in the same phonetic context in phonetic spellings generated by the pronunciation guesser.

In some embodiments that enable a user to enter a word's spelling, the system's memory further stores a correct phonetic spelling for each of a plurality of commands. Such embodiments also have command recognition circuitry for causing the speech recognizer to perform recognition of utterances against sequences of the acoustic phoneme models corresponding to the stored correct phonetic spellings of the commands and circuitry for determining whether to perform a given command as a function of the score produced by the speech recognizer for a given utterance against the correct phonetic spelling of the given command. In such embodiments the speech recognizer uses the same blended acoustic phoneme models for a given phoneme in a given phonetic context in the correct command phonetic spellings as it uses for the same phoneme in the same phonetic context in phonetic spellings generated by the pronunciation guesser.

In some embodiments of this third aspect of the invention the pronunciation guesser is an errorful pronunciation guesser that would produce phonetic spellings in which 5% or more of the individual occurrences of vowel phonemes are phonetic misspellings when generating the phonetic spellings of a given vocabulary for which the pronunciation guesser has been trained to generated phonetic spellings. In such embodiments, each of the acoustic models represents a phoneme in a phonetic context. Each of a set of acoustic models, including at least one acoustic model for each of a plurality of vowel phonemes used by the pronunciation guesser, is a blended acoustic model that represents a given phoneme in a given phonetic context as a distribution of sounds corresponding to utterances of the given phoneme and utterances of an associated set of one or more other phonemes. Over the plurality of blended acoustic models, the relative weight allocated, in a given acoustic model representing a given phoneme in a given phonetic context, between sounds of utterances of the given phoneme and each of its associated phonemes is correlated with the frequency with which the pronunciation guesser would place, when generating phonetic spelling for the given vocabulary, the given phoneme in a position in a phonetic spelling in the given phonetic context where the correct phoneme for the position is, respectively, the given phoneme and each of said associated phonemes.

In some embodiments of this third aspect of the invention the pronunciation guesser, speech recognizer, and circuitry for performing specified tasks are each comprised of memory circuitry that stores programming for performing the task associated with each such element and processor circuitry for executing such programming. In other embodiments, one or more of these elements can be comprised of hardwired circuitry for accomplishing their associated task.

According to a fourth aspect of the invention, a speech recognition system is provided that includes a machine readable memory. The memory stores pronunciation guessing programming for generating a phonetic spelling from a textual spelling of a word. The memory further stores a set of acoustic phoneme models, including at least one for modeling the speech sounds associated with each phoneme used in the phonetic spellings generated by the pronunciation guessing programming. The memory also includes speech recognition programming for recognizing an utterance by scoring the match between a sequence of the utterance's speech sounds and a sequence of the acoustic phoneme models associated with the phonetic spelling of each of a plurality of word models. The memory further includes programming for enabling the speech recognition programming to perform recognition against phonetic spellings generated by the pronunciation guessing programming.

The pronunciation guessing programming stored in memory in an errorful pronunciation guesser that would produce phonetic spellings in which 5% or more of the individual occurrences of vowel phonemes are phonetic misspellings when generating the phonetic spellings of a given vocabulary for which the pronunciation guesser has been trained to generated phonetic spellings. Each of the acoustic models represents a phoneme in a phonetic context. Each of a plurality of the acoustic models, including at least one acoustic model for at least a plurality of vowel phonemes used by the pronunciation guessing programming, is a blended acoustic model that represents a given phoneme in a given phonetic context as a distribution of sounds corresponding to utterances of the given phoneme and utterances of an associated set of one or more other phonemes. Over the plurality of blended acoustic models the relative weight allocated, in a given acoustic model representing a given phoneme in a given phonetic context, between sounds of utterances of the given phoneme and each of its associated phonemes is correlated with the frequency with which the pronunciation guessing programming would place, when generating phonetic spelling for the given vocabulary, the given phoneme in a position in a phonetic spelling in the given phonetic context where the correct phoneme for the position is, respectively, the given phoneme and each of said associated phonemes.

In some embodiments of this fourth aspect of the invention a majority of the blended acoustic models are multiphone models, each of which represents the sound of a given phoneme when it occurs in a given phonetic context defined by one or more phonemes occurring before and/or after the given phoneme in a phonetic spelling. In others a majority of the blended acoustic models are monophone models in which a given acoustic model represents the sounds of a given phoneme in all the phonetic spelling contexts in which it can occur in phonetic spellings.

In some embodiments of this fourth aspect of the invention, the system's memory further stores programming for enabling a user to enter the text spelling of a name into the system in association with an item upon which the system can perform a given function. It also includes programming for responding to such a user's entry of a name into the system by causing the pronunciation guessing programming to generate a phonetic spelling for the entered name. The memory also stores programming for responding to a user's utterance by having the speech recognition programming score the match between the sound of the utterance and sequences of the acoustic phoneme models corresponding to the phonetic spellings generated by the pronunciation guessing programming for each of one or more user entered names and programming for determining whether to perform the given function on the item associated with a given user-entered name as a function of the score produced by the speech recognition programming for the utterance against the given user-entered name.

In some such embodiments, including some in which the system is a cellphone, the item associated with a user-entered name includes a phone number and the given function is the dialing of the phone number associated with the user-entered name selected by the speech recognition programming.

In some embodiments of the fourth aspect of the invention that allow a user to enter a name, the system's memory further stores correct phonetic spellings for a plurality of names the pronunciation guessing programming phonetically misspells. In such a system the system responds to the user's entry of a name for which a correct phonetic spelling has been stored by causing the correct phonetic spelling to be used as the phonetic spelling for that name in the matching performed by the speech recognition programming. In some such embodiments the speech recognition programming uses the same blended acoustic phoneme models for a given phoneme in a given phonetic context in the correct phonetic spellings as it uses for the same phoneme in the same phonetic context in phonetic spellings generated by the pronunciation guessing programming.

In some of the embodiments in which a user can enter the spelling of a name, the system's memory further stores a correct phonetic spelling for each of a plurality of commands. It also stores command recognition programming for causing the speech recognition programming to perform recognition of utterances against sequences of the acoustic phoneme models, including the blended acoustic phoneme models, corresponding to the stored correct phonetic spellings of the commands. The memory further stores programming for determining whether to perform a given command as a function of the score produced by the speech recognition programming of a given utterance against the correct phonetic spelling of the given command.

In some embodiments of the fourth aspect of the invention, the blended acoustic phoneme model representing a given phoneme in a given phonetic context is a non-segregated model. That is, it does not represent which portions of the model's blended distribution of speech sounds are associated with the given phoneme and which are associated with one or more of its associated phonemes.

In other embodiments the system uses segregated blended models. In such an embodiment the system's memory stores a pure acoustic phoneme model associated with each of a plurality of phonemes, each of which represents the sound of a given phoneme in a phonetic context with less blending from other phonemes than a corresponding blended acoustic phoneme model for the phoneme. The memory also stores, for each of the blended acoustic phoneme models, a representation of the relative blending weights to be given to the model's given phoneme and to each of its associated phonemes in the blended acoustic model. The memory further includes programming for creating, for each given one of a plurality of blended acoustic phoneme models, a representation for use by the speech recognition programming of the blend between the model's given phoneme and its associated phonemes from a combination of the pure acoustic phoneme models corresponding to the given phoneme and its associated phonemes, based on the blending weights stored for the acoustic model.

In some of the embodiments the programming for creating a representation for use by the speech recognition programming of a blended acoustic phoneme model does so by creating from the segregated blended models a non-segregated blended model of the speech sounds associated with the given phoneme and its associated phonemes that does not separately represent which portions of the blended distribution of speech sounds are associated with the given phoneme and which are associated with one or more of its associated phonemes.

In other embodiments the programming for creating the blended representation for use by the speech recognition programming of a given segregated blended acoustic phoneme model does so by causing the speech recognition programming to compare the portion of an utterance that is mapped against the given segregated blended acoustic phoneme model in a given phonetic spelling against the pure acoustic phoneme models of the given phoneme and its associated phonemes. In such embodiments the score of the match against pure models of the given phoneme and its associated phonemes is a function not only of the degree of match against the pure model of such phonemes, but also of the relative blending weights stored in association with each of those phonemes.

In some embodiments that use segregated blended models the system's memory also stores programming adapting such models. This includes programming for responding to one or more training utterances of words by a user of the system by performing the following: (1) mapping the sounds of the one or more training utterances against word models, where each such word model includes a correct phonetic spelling and a sequence of the one or more pure acoustic phoneme models associated with the phonetic spelling; (2) altering each pure acoustic phoneme model against which a portion of one or more utterances is mapped to better represent the training utterance sounds mapping against the pure acoustic phoneme model; and (3) causing the programming for creating the representation for use by the speech recognition programming of the blend between a blended acoustic phoneme model's given phoneme and its associated phonemes to create such a blended representation from a combination of pure acoustic phoneme models that have been altered in response to the training utterances.

According to a fifth aspect of the invention a method of training a pronunciation guesser is provided. It includes obtaining the following data for each of a plurality of pronunciation-guesser training words: a textual spelling for the word; a phonetic spelling for the word; and a measure of the frequency with which the word occurs. The method uses the data obtained for each of the pronunciation-guesser training words to train the pronunciation guesser. This training includes mapping the sequence of letters of each training word's textual spelling against the sequence of phonemes of the word's phonetic spelling and using the resulting letter-to-phoneme mappings to train the pronunciation guesser. The using of the letter-to-phoneme mappings includes varying the weight given to a given letter-to-phoneme mapping in the training of the pronunciation guesser as a function of the frequency measure of the word in which such a mapping occurs.

In some embodiments of this fifth aspect of the invention, words used to train the pronunciation guesser are names, such as people's names. In some, the pronunciation guesser being trained is a D-Tree pronunciation guesser. In some embodiments the ratio of the weight given to a letter-to-phoneme mapping relative to the frequency of the given word in which the mapping occurs decreases as the frequency of the given word increases. For example, in some such embodiments the training weight varies as function of frequency raised to power less than 1.

Some embodiments of this fifth aspect of the invention use the pronunciation guesser trained by the method to generate a phonetic spelling of a word and they use a text-to-speech synthesizer to generate from the phonetic spelling the sound of the word it represents. Some such embodiments respond to the entry of a name by a user by having the pronunciation guesser generate a phonetic spelling for the user-entered name. Such embodiments perform speech recognition against acoustic word models of names, each composed of a sequence of acoustic phoneme models corresponding to a phonetic spelling generated for the name by the pronunciation guesser. They indicate to a user which name has been recognized by having the text-to-speech synthesizer generate its sound. Some such embodiments are used for voice dialing. In them the user-entered names are associated with phone numbers. Such embodiments respond to the recognition of a name by automatically dialing the phone number associated with the recognized name. They used the text-to-speech synthesizer to indicate to the user which name has been recognized, so as to enable the user to know if the recognized name is the name he or she intended to call. If not, preferably the user can abort the process of making the call to the unintended name.

DESCRIPTION OF THE DRAWINGS

These and other aspects of the present invention will become more evident upon reading the following description of the preferred embodiments in conjunction with the accompanying drawings, in which:

FIG. 1 is a schematic representation of a speech-recognition process in which the sounds of an utterance are converted into parameter frames that are compared against word models, each comprised of a sequence of phonetic models corresponding to word's phonetic spelling;

FIG. 2 is a schematic representation of the process by which the user of a cell phone can enter the text spelling of a name and cause a pronunciation guesser on the phone to generate a corresponding phonetic spelling of the entered name;

FIG. 4 is a highly simplified pseudocode representation of programming that can be used to train a pronunciation guesser according to one aspect of the present invention;

FIG. 5 illustrates some examples of the data used by the programming described in FIG. 4 to train a pronunciation guesser;

FIG. 8 is a highly simplified pseudocode description of the decision-tree training algorithm called by the programming of FIG. 4 to create a decision tree classifier for letter contexts associated with each individual letter of the alphabet;

FIG. 9 is a highly simplified pseudocode description of a routine recursively called by the decision-tree training algorithm of FIG. 8 for each node of the decision tree being created;

FIG. 11 is a highly simplified pseudocode description of the algorithm by which a decision tree pronunciation guesser of the type created by the algorithm in FIGS. 4, 8, and 9 generates a guessed phonetic spelling to correspond with the spelling of a given word;

FIG. 12 illustrates some of the phonetic spelling errors made by a lightweight, errorful recognition pronunciation guesser used in some embodiments of the present invention;

FIG. 13 indicates the speech sounds associated with each of the phoneme labels used in FIGS. 5, 6, 7, 12, 14, 15, 19, and 30;

FIG. 15 provides a expanded view of the portion of the table of FIG. 14 shown within a heavy rectangle, indicating for each of eight phonemes the number of its occurrences in guessed phonetic spellings as well as the number and percent of those occurrences in which the correct phoneme is the given phoneme itself and each of an associated set of other phonemes in place of which the pronunciation guesser mistakenly places the given phoneme;

FIG. 16 is a highly simplified pseudocode representation of an algorithm for training blended acoustic models that reflect the phonetic spelling errors generated by an errorful pronunciation guesser;

FIG. 25 is a highly simplified pseudocode representation of a method of creating a list of common names that are phonetically misspelled by the pronunciation guesser used with a given speech recognition system;

FIG. 28 is a highly simplified pseudocode representation of portions of cellphone control programming used in conjunction with voice dial and voice command recognition functions of the cellphone described above with regard to FIGS. 3, 26, and 27;

FIG. 29 is a highly simplified pseudocode description of the speech-recognition programming used in the cellphone of FIGS. 26 and 27;

FIG. 31 is a highly simplified pseudocode representation of an algorithm for training pure acoustic phoneme models for use in representations like those of FIG. 30;

FIG. 32 is a highly simplified pseudocode representation of an algorithm for training segregated blended models of the type shown in FIG. 30;

FIG. 33 is a highly simplified pseudocode representation of an algorithm for adapting pure acoustic phoneme models of the type shown in FIG. 30;

FIG. 34 is a highly simplified pseudocode representation of an algorithm for performing speech recognition against segregated acoustic models of the type shown in FIG. 30.

DESCRIPTION OF PREFERRED EMBODIMENTS OF THE INVENTION

Figure 3:
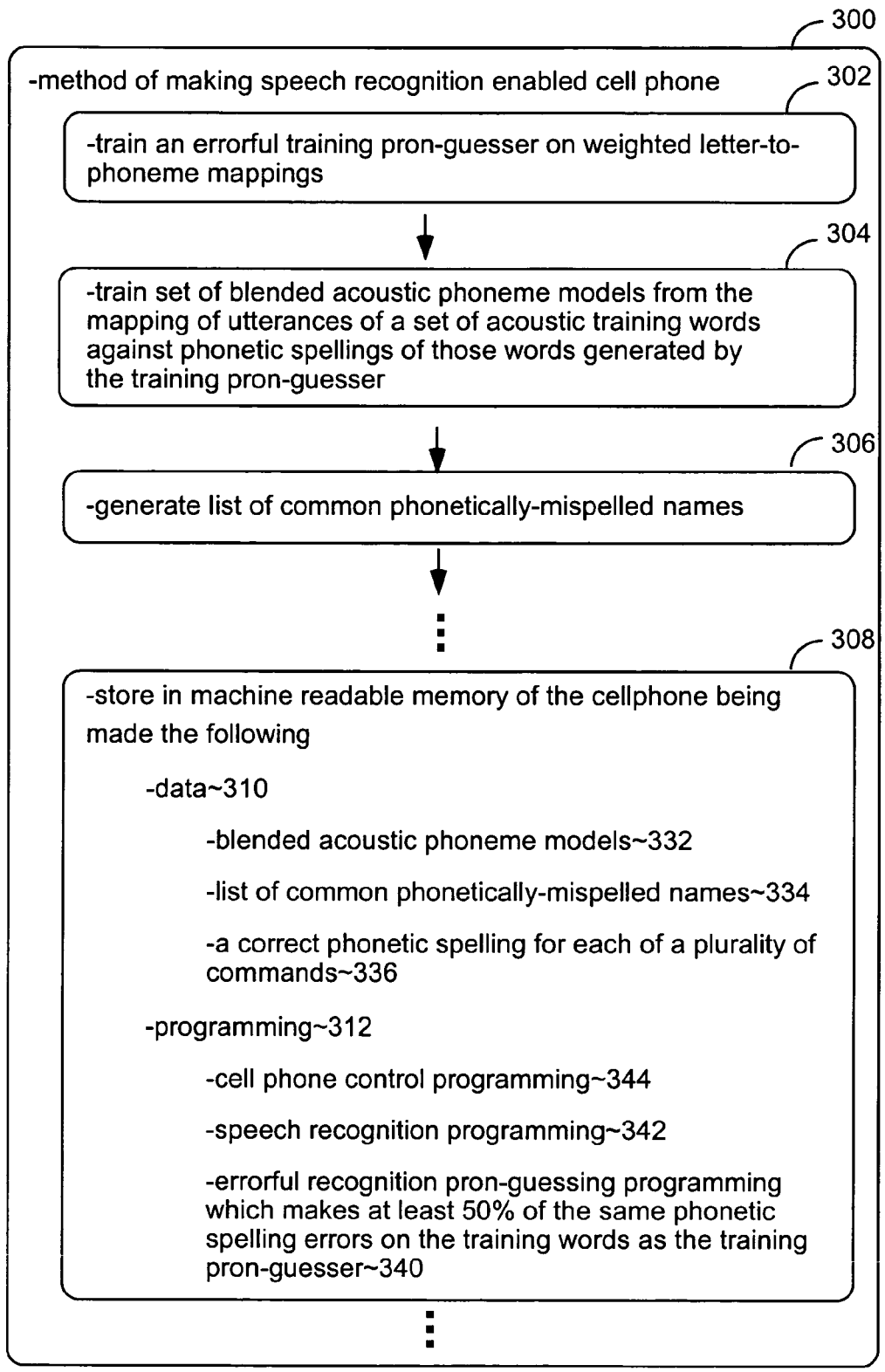
FIG. 3 is a schematic representation of a method of making a speech-recognition-enabled cell phone using the present invention.

FIG. 3 is a simplified description of a method 300 for making a speech recognition-enabled cellphone. It focuses on the aspects of such a process most specific to the present invention and does not describe other previously known aspects of the processes, represented by vertical ellipses in FIG. 3, involved in making such a cellphone, such as the manufacture of its circuitry and casing and the production of other aspects of its programming.

The parts of the method explicitly shown in FIG. 3 include a function 302 that trains an errorful pronunciation guesser to be used in the training of acoustic phoneme models; a function 304 that trains such acoustic phoneme models using phonetic spellings generated by the errorful pronunciation guesser produced by function 302; a function 306 that generates a list of common names that are phonetically misspelled by the errorful pronunciation guesser; and a function 308 that stores data and programming in the cellphone for use in speech recognition that compares utterances against word models composed of the blended acoustic phoneme models made in function 304 associated with phonetic spellings generated by an errorful pronunciation guesser that makes phonetic spelling errors similar to those made by the pronunciation guesser trained in function 302.

The pronunciation guesser trained in function 302 is called the training pronunciation guesser because the spellings it generates are used in training acoustic phoneme models in function 304. The pronunciation guesser stored in the cellphone's memory in function 308 is called the recognition pronunciation guesser because the phonetic spellings it generates are used in the cellphone's speech recognition. In many embodiments of the invention these two pronunciation guessers will be identical, but it is preferred that they at least be substantial similar. By substantially similar we mean that the recognition pronunciation guesser would make at least 50% of the same phonetic spelling errors as the training pronunciation guesser if it recognized the phonetic spellings of the training words used in the function 304. This is so that the blended acoustic models trained with phonetic spellings generated by the training pronunciation guesser will tend to reflect the same type of phonetic spelling errors that are made by the recognition pronunciation guesser.

As is indicated in FIG. 3, the function 302 weights the letter-to-phoneme mappings it used to train the training pronunciation guesser. This weighting is done as a function of the frequency of occurrence of each of the words in which a given letter-to-phoneme mapping occur. Preferably this frequency is measured in a context similar to that in which the recognition pronunciation guesser is expected to be used. In embodiments in which the invention is used for name dialing on cellphones, an appropriate frequency measure is the frequency of occurrence of a name in phone books of the nation or nations in which a particular versions of the cellphone is being marketed.

Such weighting of letter-to-phoneme training data improves the percent of times a relatively simple pronunciation guesser will be able to correctly guess the phonetic spellings of the words for which it is likely to be asked to produce phonetic spellings. It does this by causing the pronunciation guesser to dedicate more of what modeling capacity it has to learning the more commonly used letter-to-phoneme mappings.

FIG. 4 describes in more detail the algorithm 302 used for training the training pronunciation guesser. As shown in this figure, this algorithm includes a function 402 that obtains a set of data for each word in a set of words used to train the pronunciation guesser. This data includes a textual spelling of the word 404; a phonetic spelling for the word 406; and an indication 408 of the word's frequency.

An example of such data for each of four words is shown in the FIG. 5. In this table each row is associated with a given training word. The text spelling of each such training word is shown in column 404; the phonetic spelling of each training word is shown in column 406; and indications of the frequency of the word are shown in the two columns 408.

The first of the two columns 408, column 502, indicates the frequency with which the training word occurs in the database from which it is taken, which in the case of the example of FIG. 5 is a set of US telephone books. The second frequency related column, column 504, is a weight that has been derived as a function of the frequency in column 502.

In preferred embodiments of the invention the ratio of the weight in column 504 to the frequency in column 502 is less for more frequent words than for less frequent words. In one preferred embodiments this change in ratio is accomplished by causing the weight in column 504 to vary as a function of the frequency in column 502 raised to a power less than one, such as 0.7. This causes the weights in column 504 to vary in a less extreme manner than the word frequencies in column 502, so as to prevent letter-to-phoneme mappings of the most common names, such as "John" and "Mary", or "Smith" and "Jones", from totally overwhelming letter-to-phoneme mappings from less common words, which might actually decrease the performance of a pronunciation guesser, particularly if it is one with a relatively limited capability of modeling letter-to-phoneme mapping rules.

The function 402 of obtaining the data referred to in FIG. 4 can include actually deriving such data or can include merely accessing a database that already contains such data.

Function 410 of FIG. 4 performs a loop for each pronunciation guesser training word. For each such word a function 412 maps letters of the word's text spelling against phonemes of the word's correct phonetic spelling. Such correct phonetic spellings can be obtained from a source such as a name dictionary, can be compiled by humans, or can be generated by a high-quality pronunciation guesser.

Figure 6:
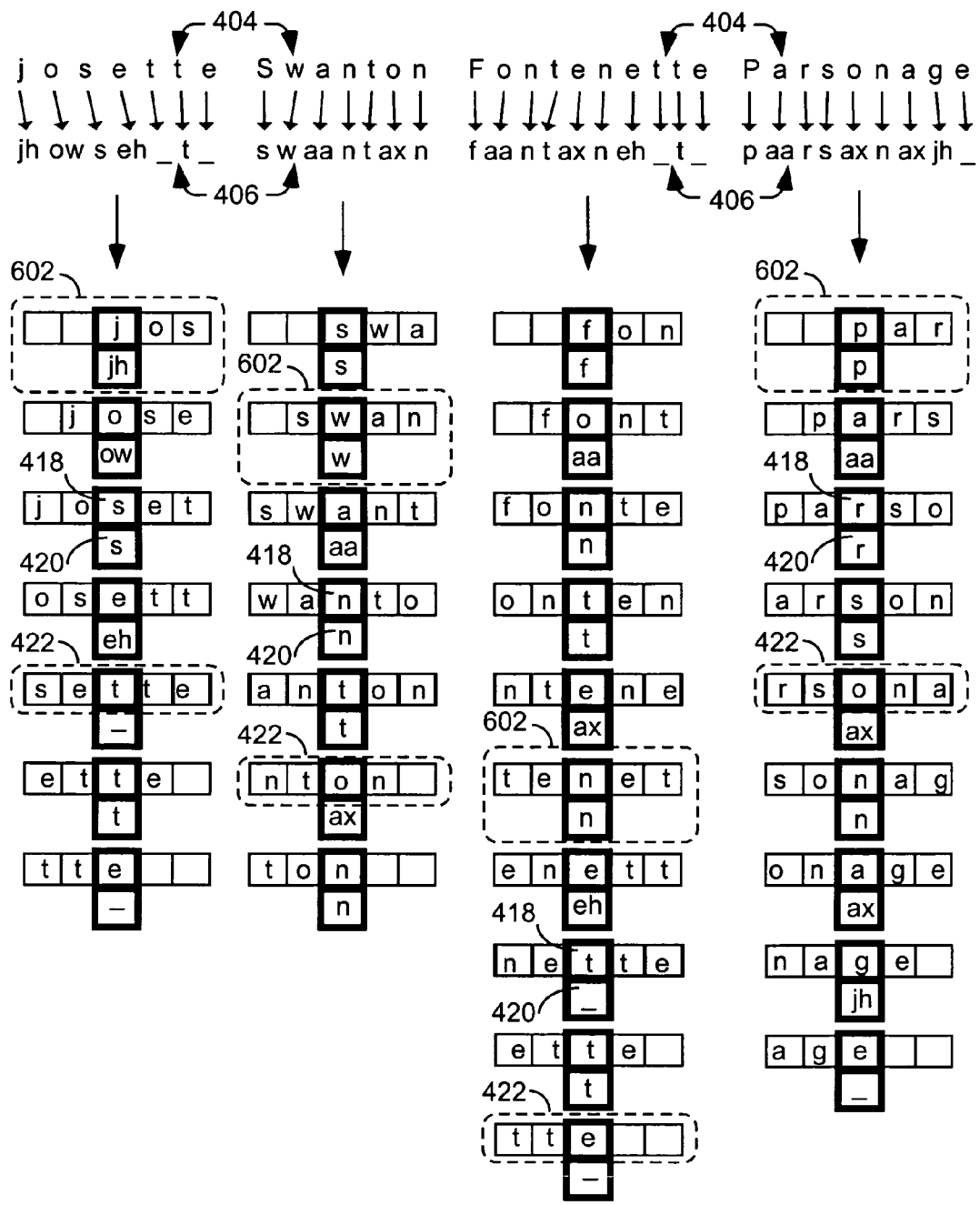
FIG. 6 illustrates how the programming of FIG. 4 maps the letters of a word's text spelling against its phonetic spelling to create letter contexts used to train a pronunciation guesser.

The top of FIG. 6 illustrates such a mapping between text spellings 404 and phonetic spellings 406. There are multiple known ways that to perform such a mapping, including manual mapping by humans. In one embodiment of the invention a hidden Markov modeling process is used that lets a given letter be mapped to either zero, one, or two phonemes, and which iterates over the entire set of text and phonetic spelling pairs to be mapped until it finds the best overall mapping of letters to phonemes.

In FIG. 6 a "_" character in a phonetic spelling corresponds to an instance in which the corresponding letter in a text spelling has no corresponding sound, or phoneme, in a phonetic spelling.

Once such a mapping has been created for a word, a sub-loop 414 causes a function 416 to create a letter context for each letter of the training word. As indicated in FIG. 4, each such letter context contains the current letter 418 for which the loop 414 is being performed; the phoneme of the training word's phonetic spelling against which the letter 418 has been mapped by function 412; and a mapping context 422 comprised of the letter 418 and a set of letters, if any, that occur near the current letter in the text spelling of training word. Although not shown in FIG. 6, each letter context also includes a frequency weight calculated as functioning of the frequency of the word, which corresponds to the weight shown in column 504 of FIG. 5.

FIG. 6 illustrates the sequence of letter contexts 602 created for each of four text-spelling-to-phonetic-spelling mappings performed by the loop 414 of FIG. 4. In FIG. 6 the mapping context 422 associated with each letter context consists of two letters before and two letters after the current letter 418 for which the letter context has been made. The size and nature of the mapping contexts used can differ in different embodiments. For example, in one embodiment of the invention that works well the mapping context includes three letters before and three letters after the current letter. It has been found that training a pronunciation guesser with letter contexts having such a large mapping context allows the pronunciation to better model some of the more subtle letter-to-phoneme rules that occur in a highly irregular set of words, such as names found in US phonebooks.

Once the letter contexts have been created for the training words, function 426 bins together all occurrences of identical letter contexts from different training words. Then, for each set of identical letter contexts, step 428 and 430 create a summed frequency weight 704, shown in FIG. 7, equal to the sum of the individual word-based frequency weights from each occurrence of the letter context. In one embodiment, if a given letter context occurs multiple times in one word, each such occurrence separately contributes the word-based frequency weight to the summed frequency weight created for all occurrences of the given letter context.

Figure 7:
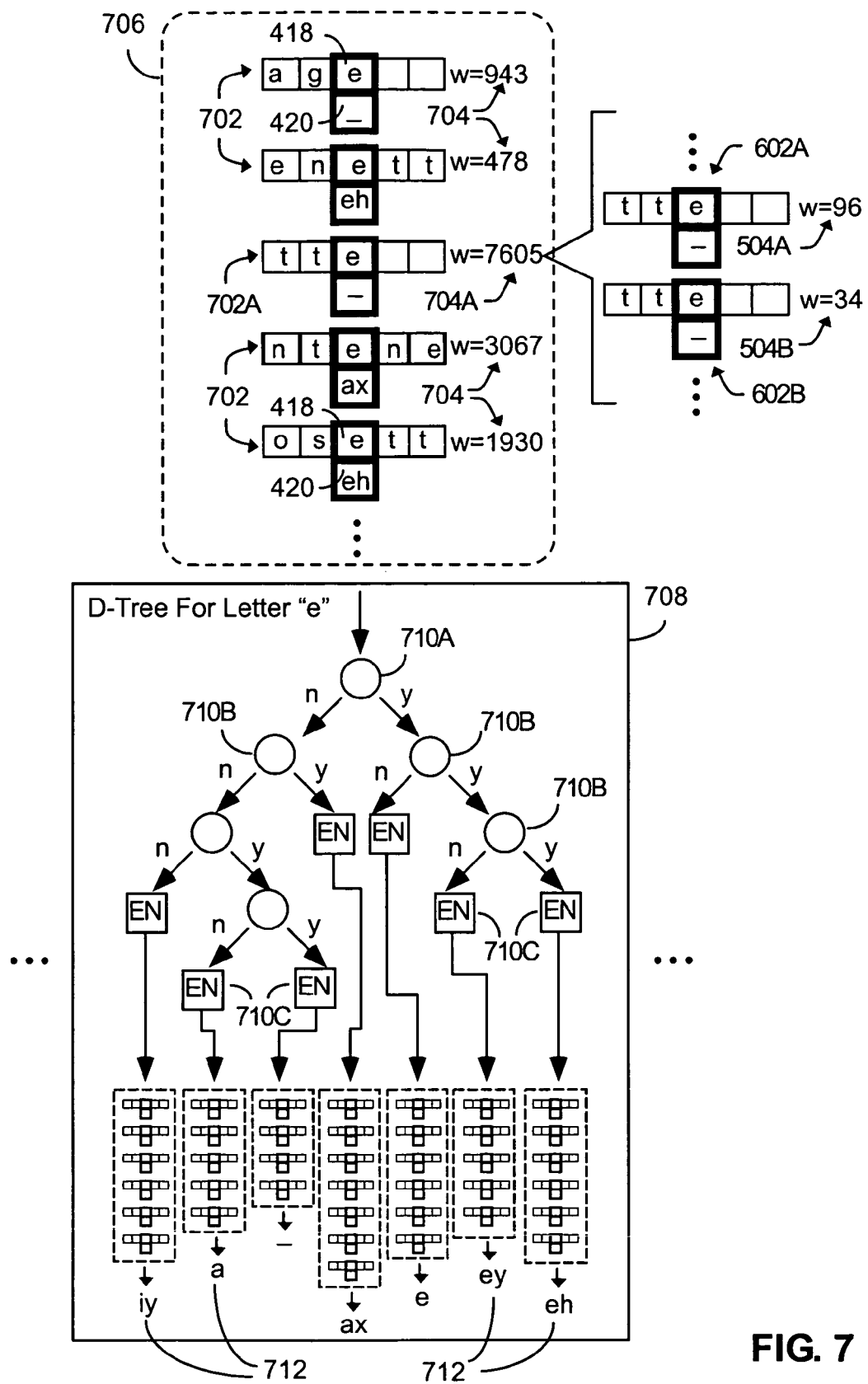
FIG. 7 is a schematic representation of the decision tree created by the programming of FIGS. 4, 8, and 9 for a given letter of the alphabet from the letter contexts, of the type shown in FIG. 6, associated with the given letter.

FIG. 7 illustrates the combining of such weights symbolically by showing the weights 504A and 504B of "tte_" letter context 602A and 602B being added together with the weights associated with other occurrences of the same letter context, represented by elipses in FIG. 7, to form the combined weight 704A associated with the combined letter context 702A for "tte_".

Returning FIG. 4, once functions 428 and 430 been completed, a loop 432 is performed for each letter of the alphabet by calling a pron-guesser D-Tree training algorithm for the set 706 of letter contexts 702 created for the letter, including the summed frequency weight 704 associated with each such letter context. This is illustrated schematically in FIG. 7, in which the set 706 of letter contexts 702 for the letter "e" is shown being supplied to the root of a decision tree 708 that is created to cluster letter-to-phoneme mappings associated with the letter "e".

FIG. 8 is a highly simplified pseudocode description of the pronunciation-guesser d-tree training algorithm 800 called by function 434 of FIG. 4. This algorithm includes a function 802 that calls the a process d-tree node algorithm shown in FIG. 9. It calls this algorithm with the current node set equal to the root of the decision tree being created for the current letter as shown at 804 in FIG. 8 and the current context set, that is, the set of letter contexts to be divided by the current node, equal to the entire set of letter contexts supplied to the decision tree's root by function 434 of FIG. 4.

FIG. 9 illustrates the process d-tree node routine 900 that is called by the routine of FIG. 8 for the root node of the decision tree created for a given letter of the alphabet. This process is also called recursively by the routine of FIG. 9 itself for each successive node that is created in such a decision tree.

The algorithm of FIG. 9 includes a loop 902 performed for each of a set of yes-or-no context questions that the algorithm allows to be asked about the combination of mapping context of each letter context. In a preferred embodiment, each question is a yes-or-no question which depends on the letter or class of letters at each of one or more positions in the mapping context associated with each letter context to be divided by the question. In some embodiments the questions have been selected by the programmer of the algorithm to focus on aspects of mapping contexts known to effect letter-to-phoneme mappings.

For each such question the loop 902 performs a function 904 that divides the current contexts set in the current call to the algorithm of FIG. 9 into two new context sets, one containing letter contexts that satisfy the current question of the loop 902 and one containing contexts that do not. Once such a division has been made, a test 905 determines whether both the new context sets created by the division are above a certain minimum size. If not, the current loop of 902 is terminated and loop 902 advances to the next context question, if any. If both of the new context sets are large enough to justify further processing, functions 906 through 914 are performed for them.

Function 906 is a loop performed for each of the new context sets created by the function 904. In this loop the entropy of each of the new sets of letter contexts is calculated based on the distribution of phonemes associated with the letter contexts in the set. This entropy calculation incorporates the contribution of each letter context's phoneme to the distribution as a function of the context's associated combined frequency based weight 704, shown in FIG. 7.

Figure 10:
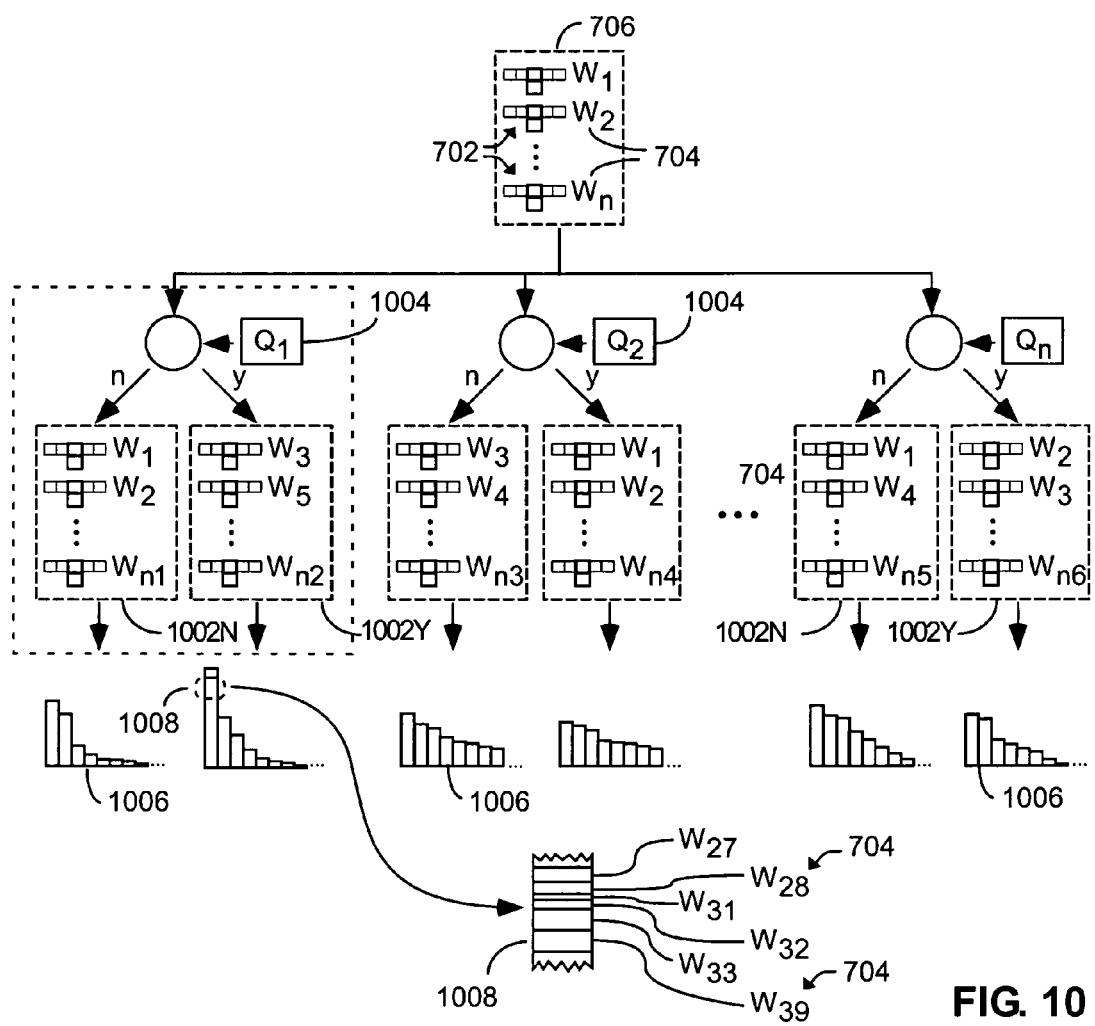
FIG. 10 is a schematic representation of the process illustrated in FIG. 9 by which a yes-no question is selected for each node of the decision tree of FIG. 7 that best splits the letter contexts that have been routed to the node.

This entropy calculation is indicated symbolically in FIG. 10, in which each of the questions 1004 associated with the loop 902 is labeled as Q1 through Qn. In this figure the set 706 of letter contexts 702 supplied to the given node is split by each of the questions 1004 into two subsets 1002$n$ and 1002$y$ which fail to comply, or comply, respectively, with that question. Under each of these context sets in FIG. 10 a bar graph 1006 is shown in which each vertical bar represents the percent of the letter contexts in the associated context set that are associated with a given phoneme by the phoneme association 420, shown in FIG. 7, of each of the letter contexts in that context set.

In the bar graphs of FIG. 10, a context set has a lower entropy if a higher percent of the total height in its bar graph is associated with a smaller number of phonemes, i.e., is concentrated in a smaller number of vertical bars. As is indicated by the blown-up portion 1008 of one such bar in FIG. 10, the contribution that each given letter context 702 makes to the height of a phoneme's associated bar is determined by the combined weight 704 associated with the given letter context.

Returning to FIG. 9, function 908 tests to see if the total entropy of the two new letter context subsets created by loop 902 for the current context question is the lowest calculated so far for any context question in the current node. If so, it causes functions 910 through 914 to be performed. Function 910 saves the entropy in a variable that represents the minimum entropy value calculated so far for the node. Function 912 saves the current context question as the best question so far in the loop 902. And function 914 saves the two new context sets created by the current question.

Once the loop 902 has been performed for each of the possible context questions, the context question that divided the nodes current context set into two subsets with the lowest total entropy will have been selected. At this point function 916 tests to see how much lower the total entropy of the two new subsets is than the entropy of the current context set supplied to the current node. If the decrease in entropy is less than a given amount, function 918 makes the new node a terminal node since there is not a sufficient decrease in entropy to justify a further subdivision of the current node. If this is the case function 920 then sets the output phoneme for the terminal node equal to the phoneme associated with the largest weighted number of contexts in the current contexts set.

If the test of function 916 finds there is a sufficient decrease in entropy to justify the further subdivision of the current node, the else function 921 causes a loop 922, comprised of functions 924 and 928 to be performed for each of the new context sub sets.

Function 924 creates a new node for the given context's subset. Function 928 recursively calls the process d-tree node routine of FIG. 9, itself, with the current node parameter set equal to the current new node of the loop 922 and with the current context set equal to that new node's set of letter contexts.

As is indicated in FIG. 7, once the sequence of recursive calls triggered by the initial call to the routine of FIG. 9 by function 802 in FIG. 8 is complete, a new decision tree for mapping letter contexts of a given letter of the alphabet will have been created. This decision tree will include a root node 710A, a set of non-root-non-end nodes 710B, and a set of end nodes 710C. Each end node will have an output phoneme 712 associated with it.

FIG. 11 illustrates an algorithm 1100 for using the set of letter-to-sound decision trees created for each of letters of the alphabet, which, when combined and taken together with this algorithm, function as a pronunciation guesser. This algorithm includes a loop 1106 that is performed for each successive letter in the text spelling of a word for which a phonetic spelling is to be generated. For each such letter a function 1108 creates a mapping context 422 of the type illustrated in FIG. 6. Then a function 1110 sends the mapping context through the decision tree corresponding to the current letter. Then a function 1112 adds the output phoneme associated with the end node of the decision tree to which the mapping context 422 has been mapped by the decision tree to the phonetic spelling being created for the word. Once this process has been repeated for each successive letter of the spelling whose corresponding pronunciation is to be guessed, a complete guessed phonetic spelling for the name will have been created.

According to the present invention the pronunciation guesser trained by function 302 of FIG. 3 and used in function 304 of that figure in the training of acoustic phoneme models is an errorful pronunciation guesser. By this we mean that at least a plurality of vowel phonemes placed in phonetic spellings generated by the training pron-guesser over the set of acoustic training words used in function 304 are errors. This percentage figure is taken over all such words, and is not weighted by the frequency of use of such words.

We have included this 5% figure in some of the claims of this application to clearly distinguish over the possibility that some recognition systems in the past may have trained acoustic data with phonetic spellings generated by pronunciation guessers in situations in which such a pronunciation guesser can achieve a low enough error rate that the effect of phonetic misspellings on the acoustic models trained would be relatively minimal, as is mentioned in the Background Of The Invention. In the past using a pronunciation guesser with an error rate as high as this 5% figure to train acoustic models would be considered harmful to recognition performance, and under most circumstances it would be.

But the inventors have found that using such an errorful pronunciation guesser to train acoustic models can actually be beneficial to recognition performance when the errors of the pronunciation guesser used to train acoustic models are similar to the errors of the pronunciation guesser generating the phonetic spellings used during recognition.

This is particularly true when the recognition is performed using small vocabularies. This is because with small vocabularies, in which there are relatively few word models, the sequence of acoustic phoneme models associated with each vocabulary word is more likely to be clearly distinct from that of any other word in the multidimensional space defined by the acoustic parameters of the phoneme models.

Using phoneme models that have been blended to reflect the phonetic spelling errors of a pronunciation guesser tends to decrease recognition accuracy on words for which the pronunciation guesser produces correct phonetic spellings because it tends to blur, or lower the resolution of, the acoustic models used for matching. On the other hand, the use of such blended models often increases accuracy on words for which the pronunciation guesser has made phonetic spelling errors, because a word model based on a phonetic misspelling will score better against the sounds of the corresponding word when using such models that have been blurred to reflect the probability of such phonetic spelling errors.

The loss in recognition performance due to blurred acoustic models tends to be much less in small vocabularies where the acoustic models of most words are quite distinct, because even when measured by the more blurred acoustic models, most word models will be easily separated. But as more and more words are added to the vocabulary the likelihood of relatively similar word models is increased and the loss of resolution caused by use of the blended models is more likely to have a net negative effect upon recognition.

Figure 14:
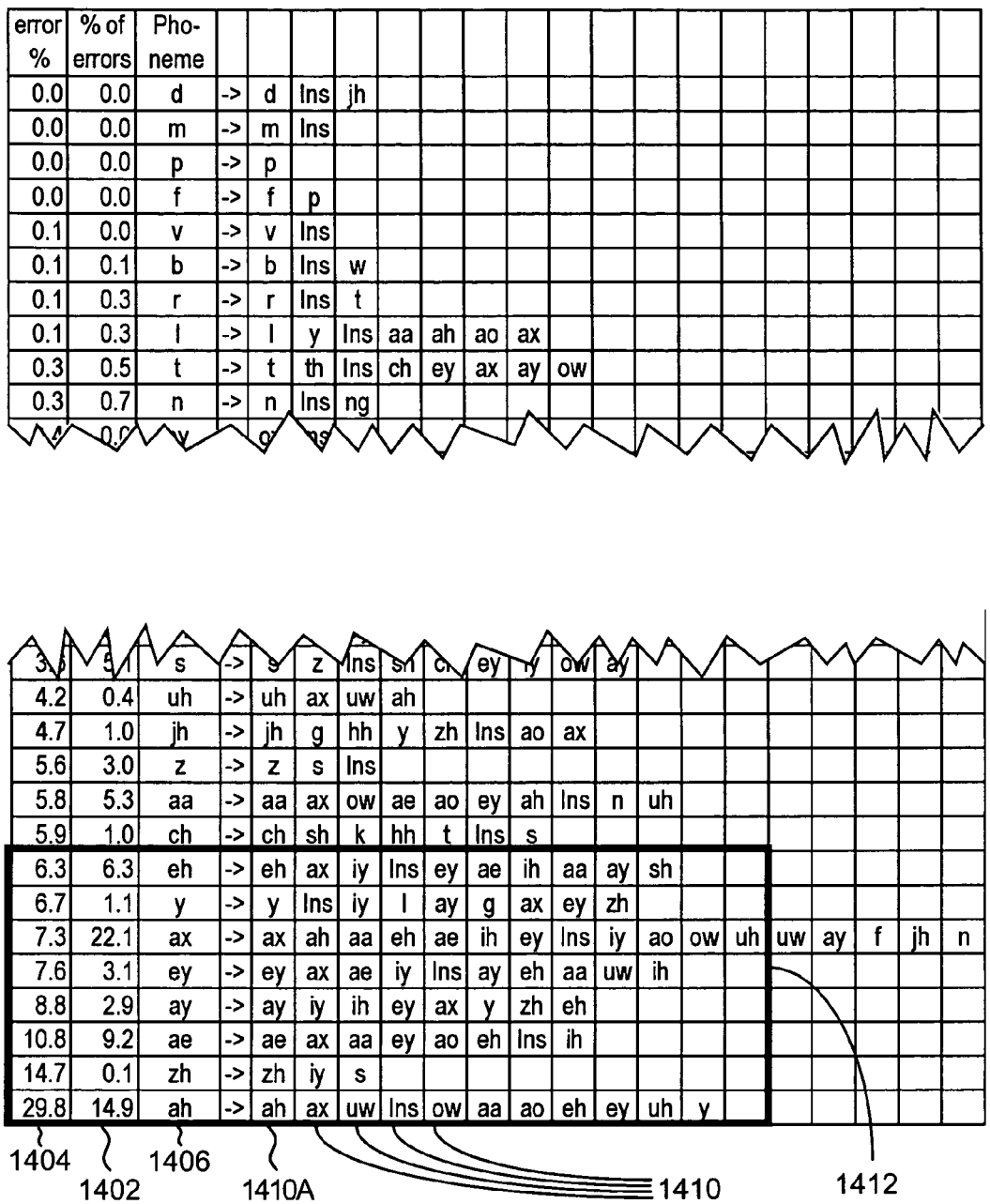
FIG. 14 is a table illustrating, for each of a subset of the phonemes used in one embodiment of the invention, the errors associated with occurrences of that phoneme in phonetic spellings of thirty thousand common names from US phone books guessed by an errorful pronunciation guesser used in some embodiments of the invention, indicating for each phoneme the percent of its occurrences in a guessed phonetic spelling that are in error, the total percentage of phoneme errors associated with the particular phoneme, and a list of the incorrect phonemes that occur in place of the phoneme in the guessed phonetic spellings.

Test have shown that recognizing with an errorful pronunciation guesser having the error rates shown in FIG. 14, when performed with the blended phonemes produced in function 304 of FIG. 3 on small vocabularies of several thousand or fewer names, produces results that are virtually as good as recognition performed on the same names using correct phonetic spellings and non-blended acoustic models.

FIG. 12 provides five examples of the type of phonetic spelling errors one errorful pronunciation guesser might make when guessing the pronunciation of names.

FIG. 13 provides a definition of the sounds for the phoneme labels used for phonetic spellings in FIGS. 5, 6, 7, 12, 14, 15, 19, and 30.

FIG. 14 is a table that provides for each of a subset of the phonemes used in one embodiment of the invention an indication of how often other phonemes are mistakenly inserted in place of it in phonetic spellings generated by a particular errorful training pronunciation guesser produced by function 302 of FIG. 3. This data is produced when guessing the pronunciation of thirty thousand more common names from US telephone books, a set of names that would be appropriate for use in the function 304 of FIG. 3 to train acoustic phoneme models.

In FIG. 14 each row is associated with a different phoneme, indicated in column 1402. The percentage of occurrences of the phoneme in a phonetic spelling generated by the training pronunciation guesser that are erroneous is indicated in column 1404. The total percent of all phonetic spelling errors created when guessing the phonetic spellings of the thirty thousand words that are associated with a given phoneme is indicated in column 1406. Each of the columns 1410 indicated a correct phoneme associated with occurrences of the given phoneme indicated in column 1402 in guessed phonetic spellings. The Column 1410A is associated with the given phoneme itself. All of the other columns 1410 are associated with instances in which the correct phoneme is other than the given phoneme associated with a given row. These other phonemes are arranged in order of the frequency with which they are the correct phoneme for occurrences of the row's given phoneme. In FIGS. 14 and 15 when "Del" is placed in a column 1410 in a given row, it refers to occurrences in which the given phoneme was placed in a phonetic spellings at a location that had no corresponding phoneme in the correct phonetic spelling.

FIG. 15 is a more detailed view of the portion of the table in FIG. 14 that is surrounded by the heavy rectangle 1412 in FIG. 14. In it, each phoneme has a set 1501 of three rows associated with it. Each of these sets of rows is separated by a bolded horizontal dividing line. Each such set of three rows includes a topmost row 1502, which corresponds to the portion of the row shown for the phoneme in FIG. 14; a second row 1504, which lists the number of occurrences of the given phoneme in all of the phonetic spellings generated for the thirty thousand words for which the phonemes listed in each column 1410 was the correct phoneme; and a third row 1506, which indicates the number of such occurrences in percentage terms.

As can be seen from FIGS. 14 and 15, the major portion of the pronunciation guesser's errors are associated with occurrences of vowel phonemes. Of the errors that are associated with consonants, a significant percent of them involve mistakenly replacing a correct voiced or unvoiced phoneme with its unvoiced or voiced equivalent, respectively—an error that may have relatively little effect upon speech recognition in an application like relatively small vocabulary name recognition. Even within the vowel phonemes some vowels contribute much more to the total percentage of spelling errors than others, with the schwa phoneme, "ax", contributing a whopping 32% of all errors, and with the seven most errorful vowel phonemes being associated with over 69% of the total number of phonetic spelling errors.

As can be imagined, providing a method for enabling speech recognition to better be able to deal with the large number of phonetic spelling errors associated with phonemes in the bottom part of FIG. 14 can significantly improve recognition performance.

As has been stated above, the present invention enables a speech recognition system to deal with such phonetic spelling errors by having its acoustic phoneme models trained on phonetic spellings which have the same sort of phonetic spellings as are generated by the pronunciation guesser used for recognition.

In some embodiments, the use of blended phonemes might be limited to only vowel phonemes, or only to phonemes that have over a given percent of the incorrect occurrence in guessed phonetic spellings, or only to those phonemes for which the use of such blended phoneme models contributes at least a certain level of improvement to recognition performance. This is because in many phonemes the effect of spelling errors made by an errorful pronunciation guesser are likely to be relatively minimal.

In a preferred embodiments of the invention, however, the blending of acoustic phoneme models occurs as a result of phonetic spelling errors used in the training of the acoustic phoneme models, and as a result most of the phonemes have at least some blending associated with them.

Returning to FIG. 3, after the function 302 has trained up the errorful training pronunciation guesser as has been described above, a function 304 trains a set of blended acoustic phoneme models. It does so by mapping utterances of acoustic training words against phonetic spellings for those words generated by the errorful pronunciation guesser.

FIG. 16 is a highly simplified pseudocode description of the process 1600 for training such blended acoustic models.

This includes a loop 1602 that is performed for each acoustic training word used in the training of the blended models. For each such word a function 1604 causes the errorful training pronunciation guesser to generate a phonetic spelling for the word. This can be performed in the manner described in FIG. 11.

Then a function 1606 creates an untrained word model for the current training word comprised of a sequence of untrained acoustic phoneme models corresponding to the word's newly created phonetic spelling.

Once this has been done, a loop 1608 repeatedly causes a function 1610 to use a hidden Markov modeling process to map one or more utterances of each training word against the acoustic model for that word. Once this has been performed for all the training words, a function 1612 alters each acoustic phoneme model to reflect the distribution of sounds that have been mapped against it over all of the training words in which it occurs. As is common in the training of acoustic models, the iteration 1608 is repeated until the degree of improvement created by further iteration drops below a certain level.

Once the acoustic training function performed by the iteration at 1608 is complete there will be an acoustic model for each phoneme used by the system.

Figure 17:
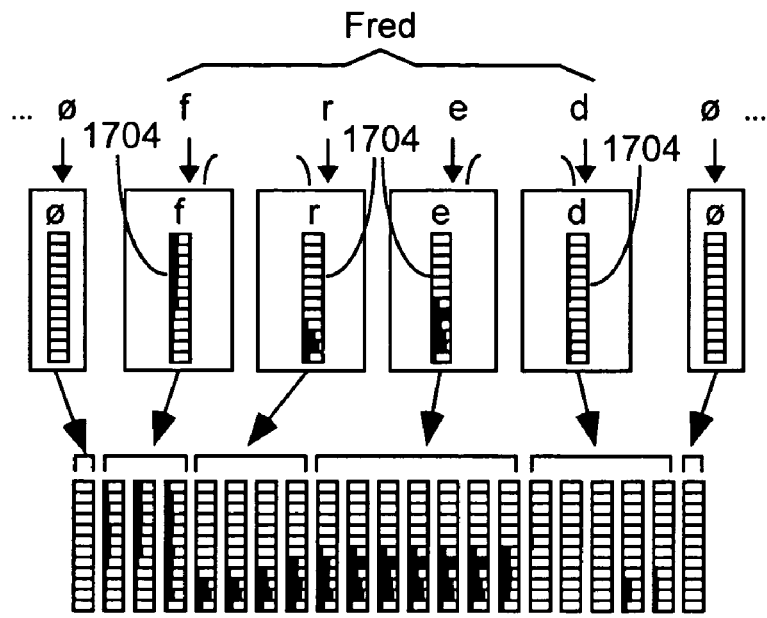
FIG. 17 illustrates phoneme models, and a word model constructed from them, in which each phoneme model is a monophone model, that is, a phoneme model having one acoustic parameter model of the type shown in FIG. 20.
Figure 18:
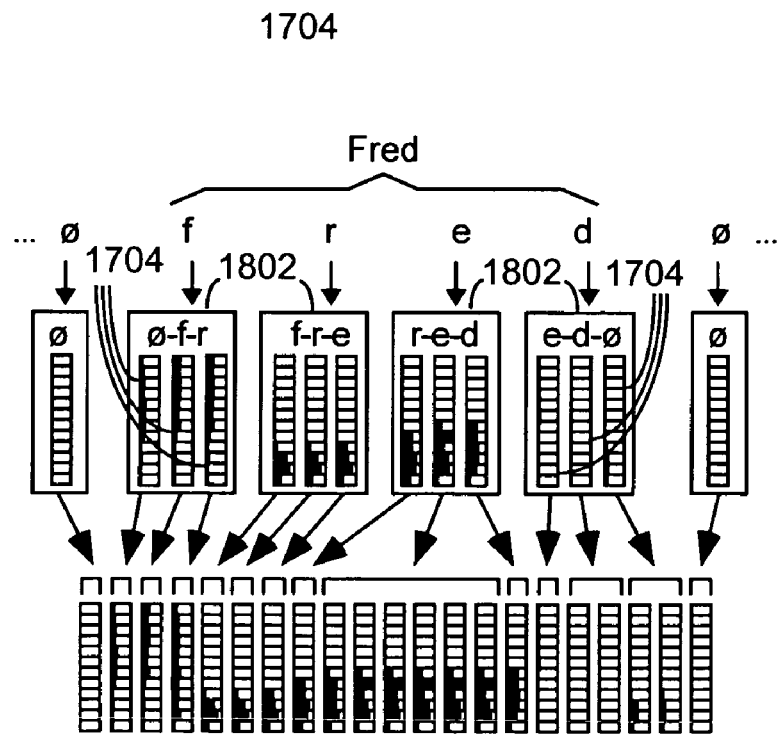
FIG. 18 illustrates phoneme models, and a word model constructed from them, in which each phoneme is a triphone model, which is a sequence of three acoustic parameter models of the type represented in FIG. 20 representing a given phoneme as a sequence of sounds in the context of a given preceding and a given following phoneme.

As is indicated by FIG. 17 in 18, the training process of FIG. 16 can be performed either on monophone acoustic models 1702, of the type shown in FIG. 17, or more complex acoustic models, such as the triphone acoustic models 1802 shown in FIG. 18. In general, better recognition is produced with more complex acoustic models, such as the triphone model of FIG. 18. This is because such models are capable of representing the acoustic variations of a given phoneme when it occurs in different phonetic contexts, as well as the sequence of different sounds formed as the vocal apparatus generates a phoneme in a given phonetic contexts.

Because the phonetic spellings used in the acoustic training described in FIG. 16 have been generated by an errorful pronunciation guesser, the training of the acoustic model for a given phoneme will often map it not only against sounds of the given phoneme but also against sounds of phonemes for which the given phoneme is confused by the errorful pronunciation guesser.

Figure 19:
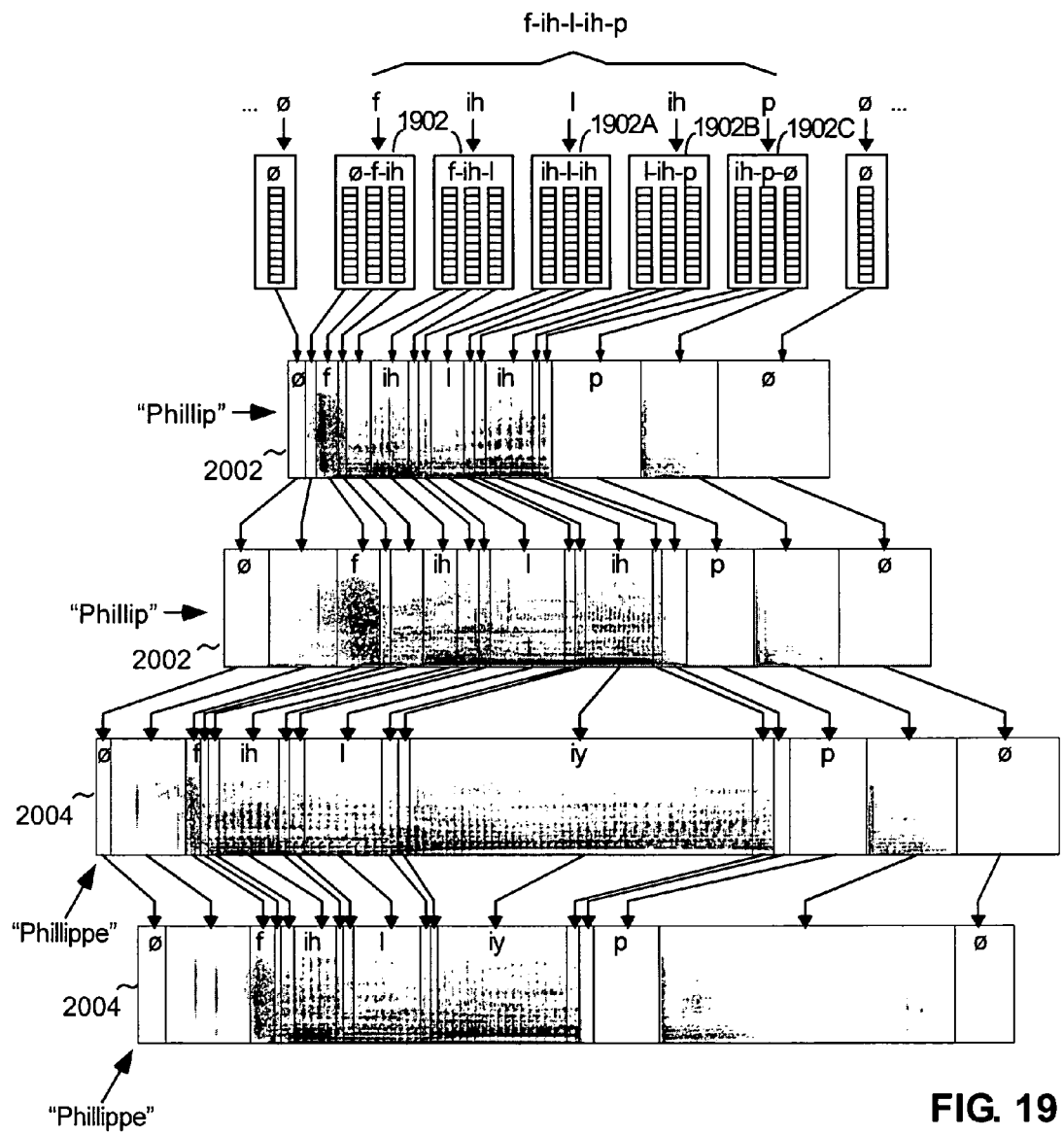
FIG. 19 illustrates how the training of FIG. 16 can time align one or more acoustic parameter models of a given phoneme against the sounds not only of the given phoneme itself but also of phonemes in place of which the given phoneme is mistakenly use in phonetic spellings by an errorful pronunciation guesser, so as to produce blended acoustic phoneme models.

In the example illustrated in FIG. 19 the pronunciation guesser has erroneously assigned the same phonetic spelling to the name "Phillippe" as it has to the name "Philip". As a result of this error the triphone acoustic model 1902A, having the phonetic spelling "ih-l-ih", which corresponds to the sound of an "l" occurring in the context of a short "i" both before and after it, gets mapped not only against a portion of utterances 2002 corresponding to that triphone, but also against portions of utterances 2004 corresponding to the sound of the triphone "ih-l-iy", in which the phoneme after the "l" is a long "e". Similarly the triphone model 1902B for the triphone "l-ih-p" not only gets mapped against portions of utterances 2002 corresponding to that triphone, but also against portions of utterances 2004 having a sound corresponding to the triphone "l-iy-p". Similarly the triphone 1902C, which models the triphone "ih-p-Ø" (where Ø corresponds to silence), not only gets mapped against portions of utterances 2002 corresponding to that triphone, but also against portions of the utterances 2004 that corresponds to the triphone "iy-p-Ø".

In a preferred embodiment there are more utterances of each training word and the extent to which each phoneme is mapped against portions of utterances corresponding to other phonemes than those contained in its triphone spelling is indicated by the error numbers of the type contained in FIGS. 14 and 15.

Each acoustic phoneme model is typically represented by one or more acoustic parameter models. In monophone models such as the monophone models 1702 shown in FIG. 17, each phonetic acoustic model has only one acoustic parameter model 1704 associated with it. In the triphone acoustic phoneme models 1802 shown in FIG. 18, each acoustic phoneme model contains a sequence of three individual acoustic models 1704, representing the successive sounds made by the human vocal apparatus when changing to produce a given phoneme in the context of a given preceding and following phoneme.

Figure 20:
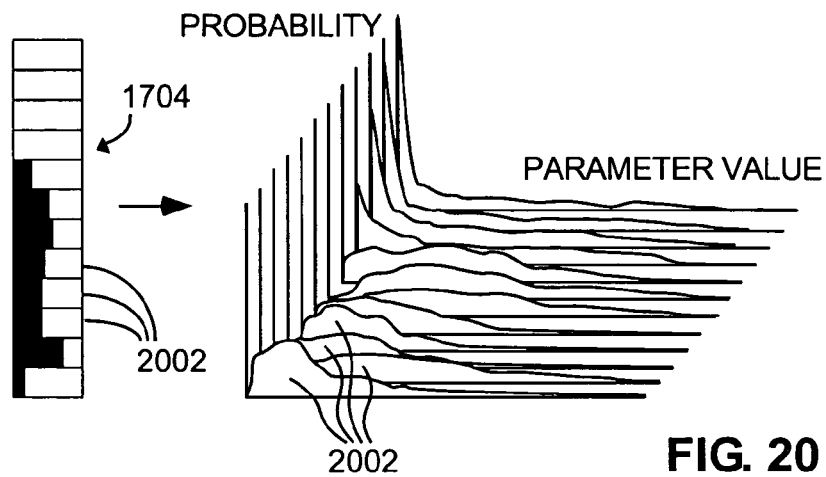
FIG. 20 is a schematic diagram of an acoustic parameter model that represents a sound as multidimensional probability distribution in a space defined by a set of acoustic parameters.

FIG. 20 illustrates how each acoustic parameter model 1704 corresponds to a multidimensional probability distribution. Because of the difficulty of representing a probability distribution with more than 3 dimensions in a 2 dimensional drawing, the probability distribution 2002 is represented by showing its distribution along each of a plurality of its dimensions, each of which corresponds to a parameter of the acoustic parameter model.

In FIG. 20 the acoustic parameter models are shown as having only 12 dimensions for purposes of simplicity, although in most current speech recognition systems it is common to have substantially more parameter dimensions.

Figure 21:
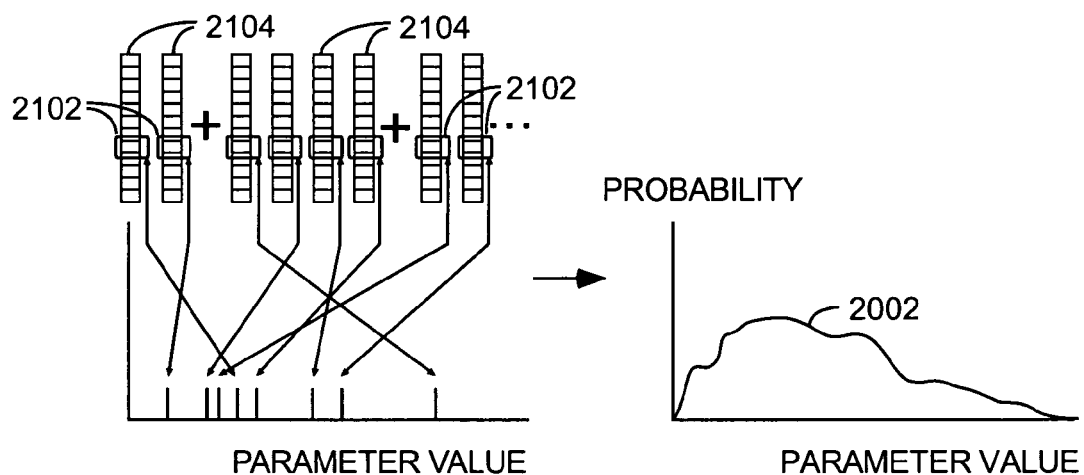
FIG. 21 illustrates how the probability distribution associated with a given dimension, or parameter, of an acoustic parameter model of the type shown in FIG. 20 is generated from the values for that parameter from a set of sound frames.

As is illustrated schematically in FIG. 21, the probability distribution 2002 associated with each given acoustic parameter 2102 is derived from the distribution of values for that parameter over a plurality of acoustic frames 2104 that have been time aligned in the training performed by FIG. 16 against the acoustic parameter model of which the probability distribution is part.

Figure 22:
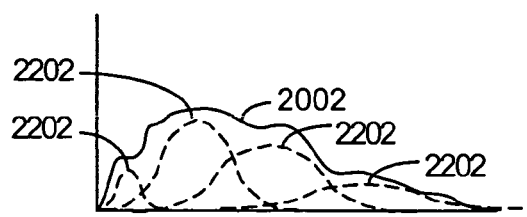
FIG. 22 represents how a probability distribution of the type shown in FIG. 21 can be approximated and represented as the weighted sum of a set of basis functions to enable more efficient storage and computation of the probability distribution.

As is indicated in FIG. 22, it is common in speech recognition to approximate a given probability distribution 2002 as a weighted series of basis functions 2202, such as Guassians, so as to enable the distribution to be more compactly represented and more efficiently used in computation.

Figure 23:
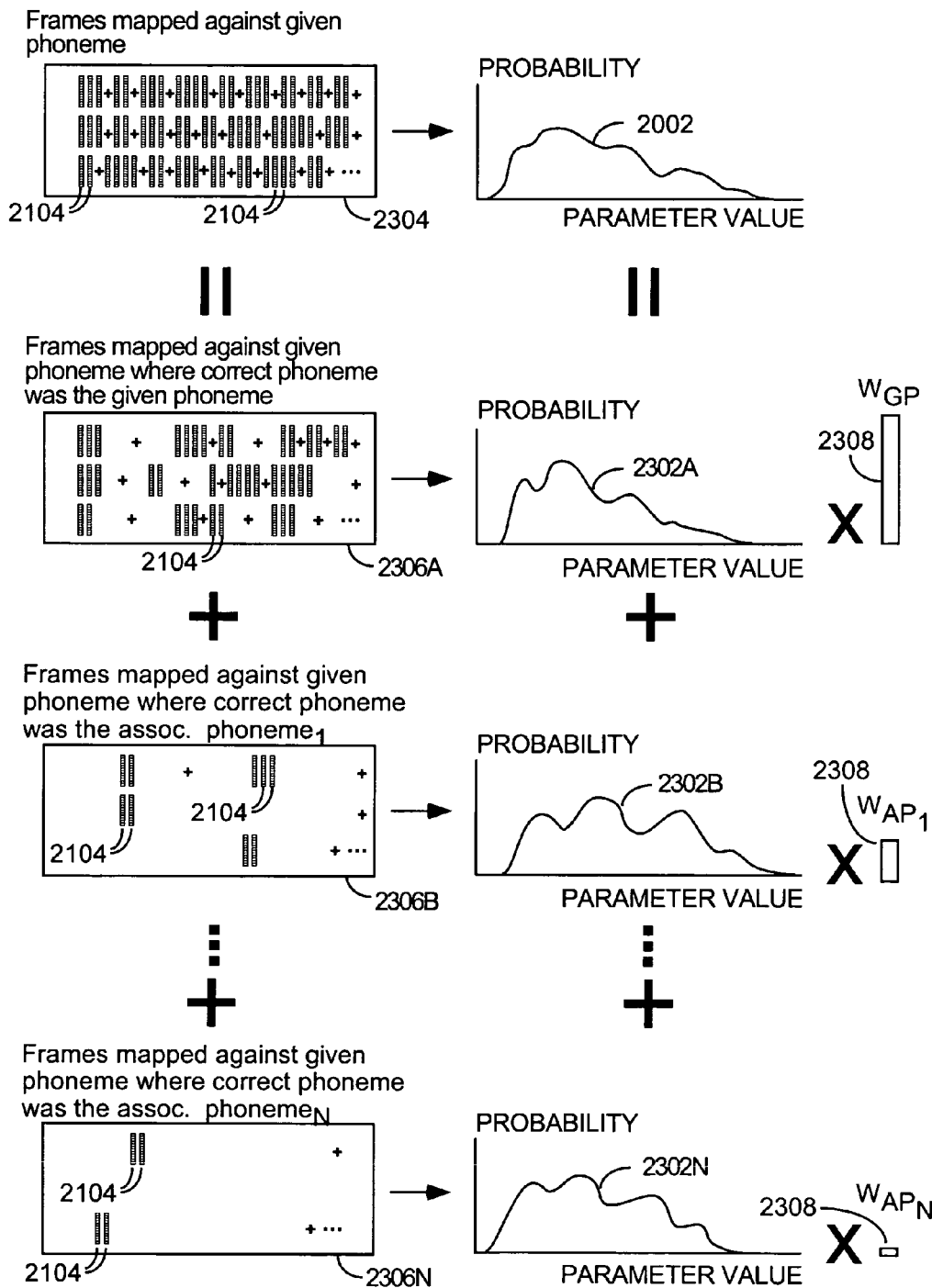
FIG. 23 illustrates how a probability distribution associated with an acoustic parameter model of a given phoneme represents not only the distribution of sounds associated with utterances of the given phoneme, itself, but also the distributions of sounds associated with one or more associated phonemes for which the given phoneme is confused by an errorful pronunciation guesser.

FIG. 23 provides a more detailed illustration of why the probability distribution 2002 produced by the training described in FIG. 16 can be called "blended" acoustic models. As is shown in this figure, this is because their acoustic parameter models have probability distributions that are, in effect, a blend of probability distributions representing different phoneme sounds. At the top of FIG. 23 is a schematic representation of the set 2304 of all acoustic parameter frames 2104 that have been mapped against a given acoustic parameter model associated with a given phoneme, whether it be the acoustic parameter model of a phoneme represented by a monophone model or by a more complex acoustic phoneme model, such as a triphone model.

At the next level down in FIG. 23 is the subset 2306A of the acoustic frames 2104 that correspond to portions of utterances that have been mapped against the given phoneme's acoustic model in a portion of the phonetic spelling of a word model where the given phoneme is, in fact, the correct phoneme.

The next level shown in FIG. 23 illustrate a subset 2306B of the frames 2104 that correspond to portions of utterances that have been mapped against the given phoneme's acoustic model in a portion of the phonetic spelling of a word model where a first phoneme, other than the given phoneme, is the correct phoneme for such a phonetic spelling. The same is true for the bottom level of FIG. 23.

As can be seen in this figure, the probability distribution 2002 produced by training for the given acoustic parameter model tends to be a weighted blend of probability distributions corresponding to the sound not only of the given phoneme itself but also to the sounds of a set of one or more associated phonemes for which the given phoneme is confused in phonetic spellings produced by the errorful pronunciation guesser. In this blend, the weight 2308 of the contribution of the sound of each of different phonemes is a function of the number of frames or the number of utterances associated with the sounds of each such phoneme.

Returning now to FIG. 16, in embodiments in the invention using triphone acoustic phoneme models it is preferable to add functions 1614 through 1618 to the process of training the blended acoustic phoneme models to allow a more compact representation of triphone models.

Function 1614 is a loop performed for each of the phonemes used in the phonetic spellings of the system. For each such phoneme, a sub-loop 1616 is performed for each triphone node number n, for the values of n from one through three. For each such triphone node number function 1618 calls an acoustic-node-clustering decision tree algorithm that operates in a manner roughly similar to that of the letter-context-clustering decision tree algorithm described above with regard to FIGS. 8 and 9. The acoustic-node-clustering decision tree clusters the set of all frames of acoustic data time aligned against the acoustic parameter model of any triphone node having the current number n of loop 1616 of any triphone model for the current phoneme of loop 1614. A process of using a similar acoustic-node-clustering decision tree process is described in greater detail in U.S. Pat. No. 5,715,367 issued on Feb. 3, 1998 to Gillick et al., entitled "Apparatuses And Methods For Developing And Using Models For Speech Recognition." This US patent is hereby incorporated by reference in its entirety.

Figure 24:
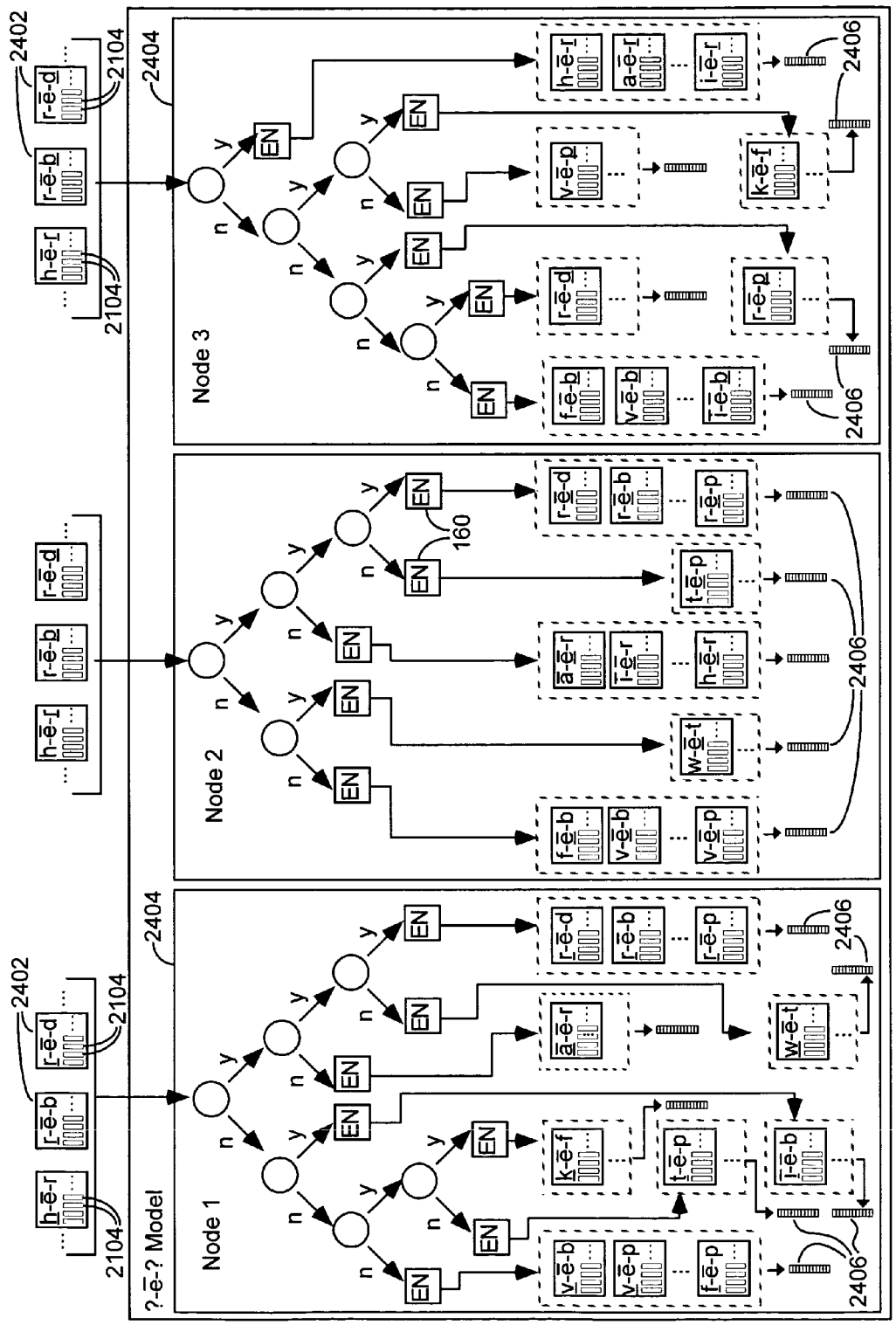
FIG. 24 is a schematic diagram of a set of three acoustic-parameter-model-clustering decision trees that are associated with each phoneme used by a speech recognition system so as to separately cluster the first, second, and third acoustic nodes, or parameter models, of each of its associated triphone models so as to enable a more compact representation of the triphones associated with each phoneme.

This process is schematically illustrated in FIG. 24, in which sets 2402 of frames 2104 that have been probabilistically time aligned against a triphone node having the current node number for the current central triphone phoneme are fed to the root of one of a set of three decision trees 2404 associated with the current central triphone. Each such set of frames includes the phonetic spelling of the triphone whose node they have been time aligned against. The decision tree seeks to cluster these frame sets into subsets 2406 of acoustically similar frame sets at the end nodes produced for the decision tree. The yes-no questions selected for each node of the decision tree are based on the phonemes in the phonetic spelling of the triphone associated with each frame set. The minimum entropy calculations performed to determine which is the best question for each node and when further subdivision of a node is no longer justified are based on distance, in the multidimensional acoustic parameter space, of the acoustic frames associated with the two subsets of frame sets 2402 produced in response to a given such question. The output of each end node of such a decision tree can is an acoustic parameter model representing the distribution of acoustic parameters associated with the frame that have been routed to the end node.

Once such a set of three decision trees has been created for each phoneme used by the system, each triphone can be represented by feeding its phonetic spelling into each of the three decision trees associated the central phoneme of its spelling. This will cause the set of the three decision trees associated with its central phoneme to produce a set of three acoustic parameter model to be used for the triphone, one representing the first, second, and third acoustic parameter models of the triphone.

The use of such clustering greatly reduces the amount of memory required to represent triphone models. For example, if an embodiment of the invention used forty phonemes, to pick a round number, it would theoretically be possible for each of forty central phonemes in a triphone phonetic spelling to be both preceded and followed by each of the forty phonemes, enabling a possibility of forty raised to the third power, or sixty-four thousand triphones. Of course, in reality not all these triphones are likely to occur, but nevertheless storing complete triphone models for even a significant portion of them would take up a large amount of memory. The parameters of the clustering algorithm used to create the decision trees of FIG. 24 can be set to substantially reduce the number of end nodes, and thus acoustic parameters models, possible for each node of a triphone. These parameters can be selected to produce the tradeoff between triphone model compactness and representational capacity deemed best for a given speech recognition system.

The clustering of frames produced by the decision trees shown in FIG. 24 causes some blending of acoustic models, in the sense that it combines together acoustic data from frames associated with different triphone phonetic spellings to generating the acoustic parameter models that are the output associated with each end node of such a decision tree. In the rest of this application and the claims that follow when we refer to "blended" acoustic models we are not referring to such blending performed by the clustering of similar acoustic parameter models for the purpose of producing more compact acoustic model representations. Instead we are referring to the blending of acoustic models that represents the effect on the mappings of utterances against acoustic phoneme models that results from incorrect phonetic spellings generated by an errorful pronunciation guesser.

Before the clustering of triphone models performed by the decision trees of FIG. 24, each triphone represents the occurrence of its central phoneme in one specific phonetic context, that defined by a given preceding, and a given following, phoneme. After the clustering performed by a set of decision trees of the type shown in FIG. 24, a given unique sequence of three acoustic parameter models produced by the output of that decision tree will normally represent the sound of the central triphone phoneme for a set triphone spellings. Nevertheless, the phonetic context in which each unique sequence of three acoustic parameter models produced will be used is considerably more narrow than the phonetic context in which a monophone model of the type illustrated in FIG. 17 will occur, which includes all situations in which its associated phoneme can occur.

Returning to FIG. 3, another function in the making of the speech recognition enabled cellphone described in that figure is function 306. This function generates a list of common names that are phonetically misspelled by the errorful pronunciation guesser to be used by the speech recognition of the cellphone.

FIG. 25 describes the function 306 in more detail. It contains a loop 2602 that is performed for each of a set of names that occur frequently in US phone books. For each such name, this loop compares the phonetic spelling guessed for the name by the cellphone's errorful pronunciation guesser with the correct phonetic spelling for the name. If the guessed phonetic spelling is wrong, the word is marked as one that is phonetically misspelled by function 2606. Once this has been performed for all of the set of common names, a loop 2608 is performed for each of a given number of the most common names marked as phonetically misspelled. For each of these most common names function 2610 adds to a list of common phonetically-misspelled names an entry for the misspelled name. This entry includes the text spelling of the name 2612 and the correct phonetic spelling of the name 2614.

The use of list of common phonetically-misspelled names significantly improves the frequency-weighted accuracy of name recognition on the cellphone being created because it helps ensure that correct pronunciations are used for the most commonly used names that the recognition pronunciation guesser phonetically misspells. The use of both this list and blended acoustic phoneme models significantly improves name recognition accuracy. It does so by both increasing the percentage of actually used names that have correct phonetic spellings and increasing recognition performance on names that do not have correct phonetic spellings.

Although not shown in FIG. 3, in some embodiments of the invention the list of commonly phonetically misspelled names could be used when generating the phonetic spellings of acoustic training words used in the training of blended acoustic phoneme models by function 304. This would enable the blended acoustic phoneme models to more accurately represent the phonetic spelling performance of the recognition pronunciation guesser.

Returning again to FIG. 3, after the functions 302 through 306 have been completed, a function 308 stores in the machine-readable memory of the cellphone being made the data and programming indicated in FIG. 3. The data includes the blended acoustic phoneme models 332 created by function 304, the list of common phonetically misspelled names 334 created by function 306, and the correct phonetic spelling for each of a plurality of commands the user is to be able to evoke by speech recognition. The programming added includes a cellphone control program 344, speech recognition programming 342, and an errorful pronunciation guesser to be used in conjunction with the speech recognition programming.

As has been stated above, in many embodiments of the invention this recognition pronunciation guesser will be identical to the training pronunciation guesser created by function 302 of FIG. 3 and used by function 304 of that figure in the training of the blended acoustic phonetic models. It would, however, be possible to obtain some benefit of the aspect of the invention relating to blended models as long as the pronunciation guesser used in with the speech recognition is substantially similar to the training pronunciation guesser as defined above. But it is the inventors' current belief that the closer the recognition pronunciation guesser is to training pronunciation guesser, the better.

Figure 26:
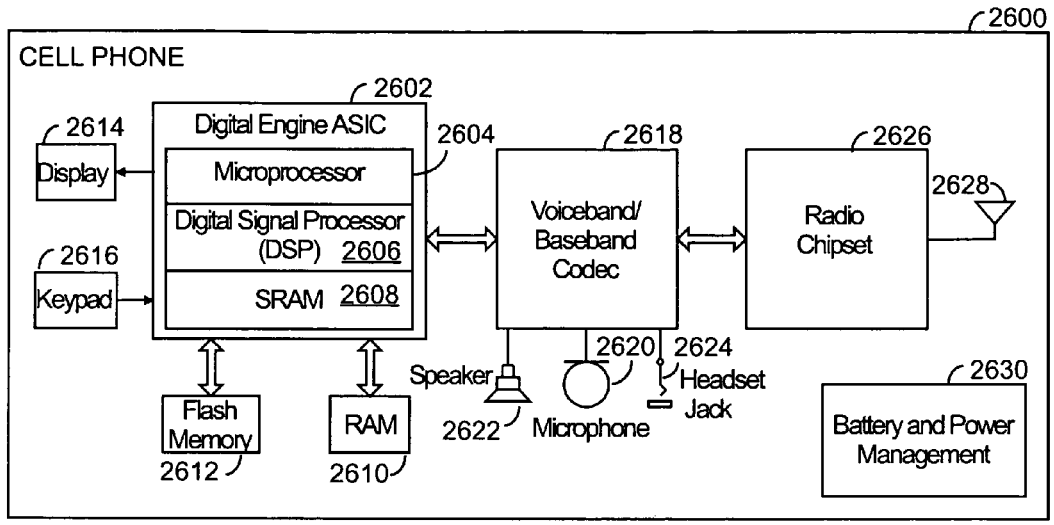
FIG. 26 is a schematic block diagram showing basic components of a common cell phone.

FIG. 26 is a simplified schematic block diagram of a typical cellphone 2600. The cellphone includes a digital engine ASIC 2602, which is an integrated circuit that includes circuitry that comprises a microprocessor 2604, a digital signal processor 2606, and relatively high speed static random access memory, or SRAM, 2608. The ASIC 2602 is connected so as to read program instructions from, and to write data to, a relatively small amount random access memory 2610 and a significantly larger amount of flash programmable nonvolatile memory 2612, which acts as a mass storage device for the cellphone. The microprocessor of the a ASIC drives a display 2614. It also receives input from a keypad 2616. The ASIC is connected to receive data from, and supply data to, a voiceband/baseband codec 2618. This codec is connected to receive input from a microphone 2620 and to drive a speaker 2622. It is also designed to receive input from and output to a cellphone handset through a headphone jack 2624. The codec is connected to a radio frequency chipset 2626, which is capable of transmitting and receiving digital signals via radio frequency over an antenna 2628. The cellphone also includes battery and power management circuitry 2630.

Figure 27:
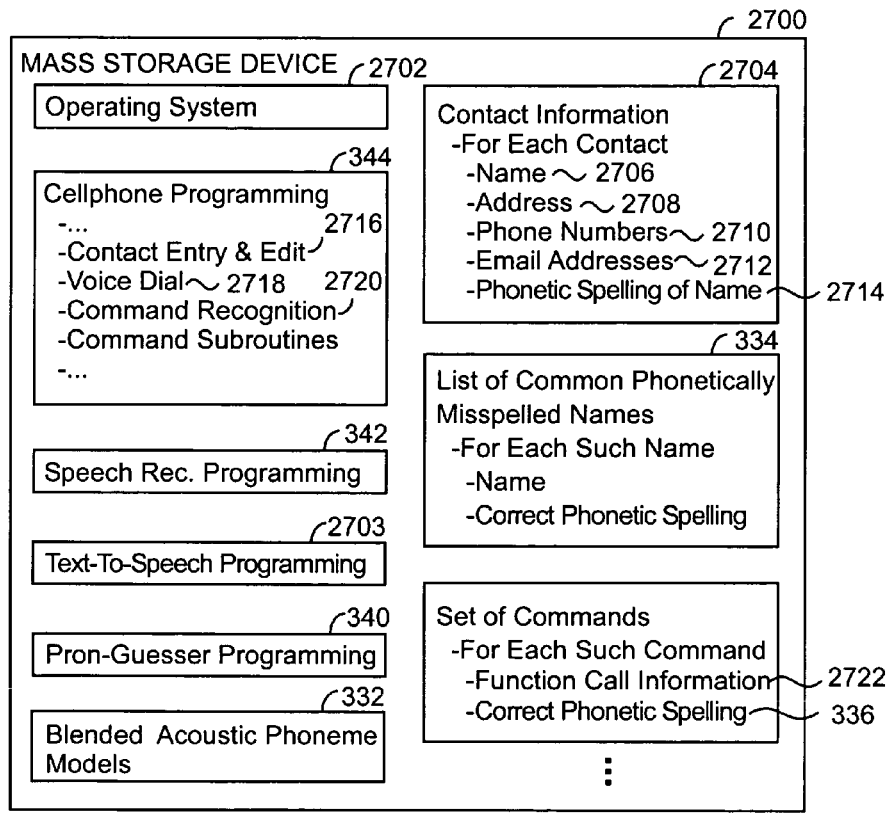
FIG. 27 is a schematic diagram showing some of the programming and data objects stored in the mass storage device of a cell phone such as that in FIG. 26 in certain embodiments of the invention.

FIG. 27 is a block diagram indicating some of the data and programming structures stored in the mass storage device 2700 of the cellphone. In the embodiment of FIG. 26 this mass storage device is the flash memory 2612. However any other type of mass storage devices appropriate for use in a cellphone could be used.

Commonly the cellphone's mass storage device will include operating-system programming 2702, as well as the cellphone's control programming 334 referenced in FIG. 3. In the embodiment disclosed it includes text-to-speech synthesis programming 2703. This is a well-known type of programming capable of generated the sound of a word from its phonetic spelling. The memory also include the speech recognition program 342 and the pronunciation guessing program 340 also referenced in FIG. 3. In addition it will include the blended acoustic phoneme models 332, the list of common phonetically misspelled names 334, and the correct phonetic spellings 338 for each of a plurality of cellphone commands referenced in FIG. 3.

The cellphone control programming 334 includes programming 2716 for enabling the entry and editing of contact information, programming 2718 for performing voice dialing, and programming 2720 for recognizing and evoking commands by voice recognition. This contact entry and edit programming 2716 enables the user to enter contact information 2704 for each of a plurality of contacts, which can include for each contact a name 2706, an address 2708, one or more phone numbers 2710, an e-mail address 2712, and a phonetic spelling 2714 of the name 2706. This phonetic spelling can either be generated by the recognition pronunciation guesser 340 or derived from the list of common phonetically misspelled names 334 as is described below with regard to FIG. 28.

FIG. 28 is a simplified representation of the cellphone control programming 334 shown in FIG. 27. It illustrates aspects of that programming most relevant to the present invention. These included contact entry and edit programming 2716, voice Dial programming 2718, and command recognition programming 2720.

The contact entry and edit programming 2716 includes a function 2802 that responds to a user's selection to enter a mode for entering and editing contact information by causing the functions indented under it in FIG. 28 to be performed. This includes a function 2804 that calls a name entry routine to enable the user to enter the contact name 2706, shown in FIG. 27. Normally this is done by allowing a user to type characters into the keypad of the cellphone as described above with regard to FIG. 2.

If the user has entered a new name, function 2806 causes the functions indented under it in FIG. 28 to be performed. This includes a function 2808 that creates a blank phone contact for the new name, function 2810 that enters the spelling of the name into the name field of the contact record, and function 2812 that tests to see if the spelling of the name is one for which a correct phonetic spelling has been stored in the list of common phonetically misspelled names 334 shown in FIG. 27. If the new names is on this list, function 2814 places the correct phonetic spelling contained in the list in the phonetic spelling field 2714, shown in FIG. 27, for the record. If the new name is not on the list, function 2815 calls the pronunciation guesser 340 of FIG. 27 to guess a phonetic spelling for the new name. Once this is been done, function 2818 places the newly generated phonetic spelling in the phonetic spelling field for the new contact record.

The contact entry and edit programming 2716 also includes functions 2822 and 2824 for enabling a user to enter a telephone number 2710, shown in FIG. 27, into the new contact record that has been created for the newly entered name.

If the user selects a voice dial mode the voice dial programming 2718 shown in FIGS. 27 and 28 will be activated. This includes function 2828 that calls the speech recognition programming 342 shown in FIGS. 27 and 29 to perform speech recognition upon the next utterance detected by the circuitry of the cellphone. Function 2828 call the speech recognition program with the recognition vocabulary corresponding to names in the phones contact records, including both names with phonetic spellings taken from the list of common phonetically misspelled names and names with phonetic spellings generated by the recognition pronunciation guesser.

FIG. 29 provides a highly simplified representation of the speech recognition programming, showing that if it detects another utterance, function 2902 causes a function 2906 to score the match between the sound of the utterance and a sequence of the blended acoustic phoneme models 332 shown in FIG. 27 corresponding with the phonetic spelling of each word in the vocabulary for which the recognition program has been called. Once this is done, function 2908 returns with an indication of the one or more words having the best score in the match performed by function 2906.

Returning to FIG. 28, when the call to the speech recognition programming in function 2828 returns, function 2830 tests if the best match is a name from a contact record. If so, function 2832 tests to see if there is a phone number associated with that contact record, and, if so, functions 2833 and 2934 are performed. Function 2833 uses the text-to-speech synthesizer programming 2703 shown in FIG. 27 to generate the sound of the recognized name from its associated phonetic spelling 2714 shown in FIG. 27. Function 2834 then dials that phone number. Preferably the user can prevent or abort the call if the name recognition was incorrect.

If the best matching word return by the call to the speech recognition programming in function 2828 corresponds the to the phonetic spellings 338, shown in FIG. 27, of a command, functions 2836 and 2838 call the subroutine associated with that command using the function call information 2722 shown in that FIG. 27.

The command recognition programming 2720 shown in FIG. 28 includes a function 2840 that causes the functions indented under it in FIG. 28 to be performed if the user enters a command recognition mode. This includes a function 2842 that calls the speech recognition programming, described above with regard to FIG. 29, with a recognition vocabulary corresponding to the commands that are recognizable in the selecting command mode. In many instances, a given command can correspond to multiple natural language words said together, such as "make appointment" or "enter new contact name."

If a call to the speech recognition programming in function 2842 returns with a best match corresponding to a phonetic spelling 336, shown in FIG. 27, corresponding to a command in the current recognition vocabulary, functions 2844 and 2846 call the subroutine associated with the giving command by using the function call information 2722, shown in FIG. 27, associated with the best matching phonetic spelling.

Figure 30:
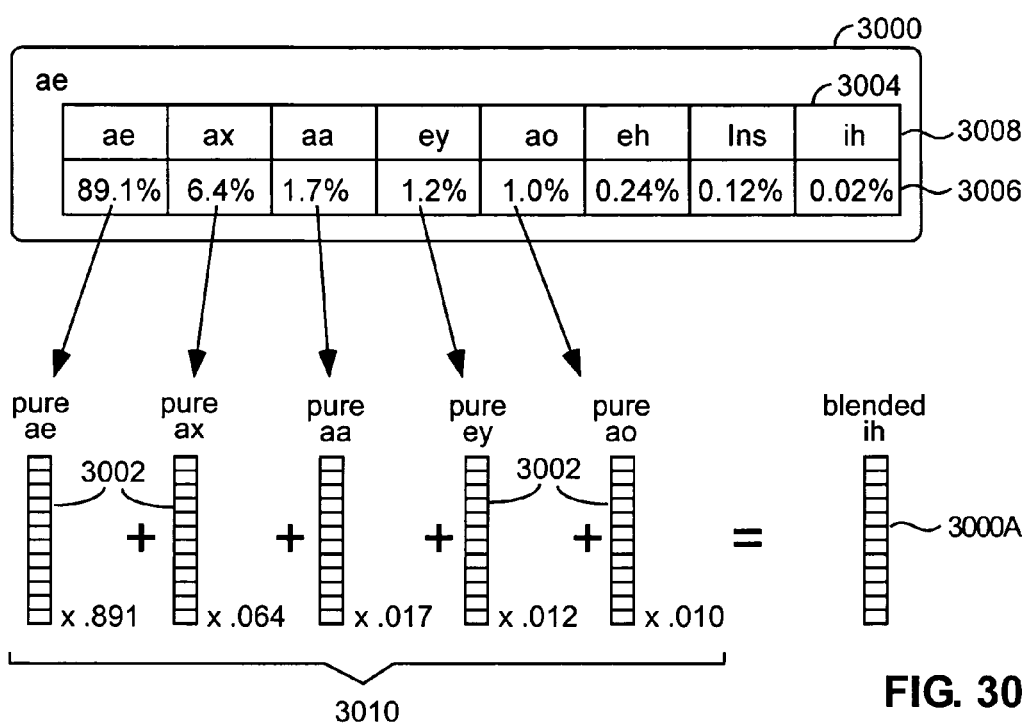
FIG. 30 represents an alternate way in which blended acoustic phoneme models can be represented, in which each given phoneme is represented as the weighted sum of segregated pure acoustic models and the pure acoustic models are of the correct phonemes that correspond to occurrences of the given phoneme in phonetic spellings generated by an errorful pronunciation guesser.

FIG. 30 represents another type of blended acoustic model that can be used in alternate embodiments of the invention. These are what we call "segregated" blended acoustic models, because each such model 3000 represents a blended acoustic phoneme model as a weighted sum of separate unblended, or pure, acoustic phoneme models 3002.

In the example of FIG. 30 a segregated blended acoustic model 3000 is shown for the "ae" phoneme illustrated in FIGS. 13 and 14. Associated with this model is a table 3004 which has a separate column for each of the phonemes in the correct phonetic spellings that corresponds to occurrences of the "ae" phoneme in phonetic spellings generated by the errorful pronunciation guesser whose blended phonemes are being modeled. In the top row 3006 of this table is listed each of the phonemes in place of which the "ae" is placed in phonetic spellings by the pron-guesser, and below each of these in the row 3008 is listed the percent of occurrences of the "ae" phoneme associated with each of the phonemes in the row 3006. The blended phoneme is represented as the sum 3010 of each of the pure acoustic phoneme models 3002 associated with the phoneme in the columns of the table 3004 multiplied by the percentage weight associated with each such phoneme in the bottom row of that table.

In the example of FIG. 30, the pure acoustic phoneme models are monophone models, but in other embodiments triphone or other types of acoustic phoneme models could be used.

The major advantage of representing blended phonemes in a segregated manner is that it tends to enable easier adaptation of acoustic phoneme models to the speech sounds of a given user, since it does not require the relatively large amount of training utterances that would be required to properly statistically reflect the spelling errors made by a given errorful pronunciation guesser. Instead this statistical information, which does not vary from user to user, is kept in the weights shown in row 3008 of FIG. 30.

In this specification and the claims that follow when we refer to a "pure" acoustic phonetic model of a given phoneme, we do not intend to mean one that has been derived from no data whatsoever other than data associated with occurrences of the giving phoneme. For example, in some embodiments of the invention using segregated acoustic phoneme models, the pure models may be produced by using acoustic node clustering like that described above with regard to FIG. 24. Instead by "pure" acoustic phonetic models we mean phonetic models that have not been trained to model phonetic spelling errors associated with occurrences of their phoneme in phonetic spellings produced by an errorful pronunciation guesser.

FIG. 31 is a simplified pseudocode description of programming for training the pure acoustic phoneme models 3002 to be used with segregated blended models. This algorithm is identical to that described above with regard to FIG. 16, except that its function 1604A, shown in all-capitalized letters, uses correct phonetic spellings for the acoustic training words rather than phonetic spellings generated by an errorful pronunciation guesser, and except for the fact that it does not explicitly include the phoneme clustering functions 1614 through 1618 of FIG. 16.

FIG. 32 illustrates an algorithm 3200 for training a segregated blended model of the type shown in FIG. 30.

This algorithm includes functions 3202 and 3204 that create an empty mapping list for each of the phonemes used by the pronunciation guesser with which the segregated blended models are to be used. Then a loop 3206, comprised of all the functions indented under it in FIG. 32, is performed for each of a plurality of acoustic training words. In this loop function 3208 has the errorful pronunciation guesser generate the phonetic spelling for the current training word. Then a function 3210 maps the phonemes of the generated phonetic spelling against the correct phonetic spelling for the word.

Then a loop 3212 is performed for each phoneme in the guessed phonetic spelling. This loop includes a function 3214 that defines the sequence of one or more correct phonemes matched against the guessed phoneme. Then function 3216 tests if the sequence mapped against the current guessed phoneme already has an entry in the guessed phoneme's mapping list. If not, function 3218 creates an entry in the mapping list for that sequence of one or more correct phonemes and sets its count to one. Otherwise, functions 3220 and 3222 increment the count of the entry in the guessed phoneme's mapping list corresponding to the sequence of one or more correct phonemes mapped against the current guessed phoneme.

Once loop 3206 has been performed for each acoustic training word, the mapping list associated with each of the phonemes used by the pronunciation guesser will have occurrence counts similar to those shown in row 1504 of FIG. 15. These counts indicate, for each sequence of one or more phonemes a given phoneme has been used in place of in a phonetic spelling, the number of times such a mapping has occurred. Once this is done, functions 3224 and 3226 normalize the count values associated with such a mapping so that all the mappings associated with each phoneme have a count value that adds up to one. This causes the count values to correspond to the percentage values shown in rows 1506 of FIG. 15 and row 3008 of FIG. 30.

FIG. 33 represents an algorithm 3300 for adapting pure acoustic models 3002 of the type shown in FIG. 30. This includes a function 3302 to prompt a user to say utterances of one or more adaptation training words. It also includes a function 3004 for the mapping the utterances of each adaptation training word against a sequence of pure acoustic phoneme models corresponding to a correct phonetic spelling of the training word. A function 3306 uses the sounds mapped against each pure acoustic phoneme model to adapt the probability distribution associated with the pure acoustic model.

In some embodiments of this aspect of the invention adaptation my take place automatically during use, without the use of the prompting of function 3302. In other embodiments the adaptation process may iterate the mapping of the sounds used in adaptation against word models multiple times, in a manner similar to that described above with regards to steps 1608 through 1612 described above with regard to FIGS. 16 and 31, to obtain a relatively optimal mapping of such sounds for use in such adaptation.

In some embodiments of the invention using segregated acoustic phoneme models, functions 3308 through 3316, shown in italics in FIG. 33 are performed to create a non-segregated blended acoustic phoneme model 3000A, shown in FIG. 30. This non-segregated blended acoustic model can then be used to represent its associated phoneme during recognition. Normally such a blended model would be created once, shortly after adaptation, but it could be created dynamically at recognition time.

In embodiments of the invention that create such a non-segregated blended model, loop 3308 performs the functions indented under it in FIG. 33 for each phoneme used by the system. This includes a function 3310 that creates an empty blended acoustic phoneme model for the given phoneme and a loop 3312 performed for each of the phonemes in the row 3006 of FIG. 30 in the given phoneme's mapping list that has a score in the row 3008 above a certain value. This loop includes a function 3314 that multiplies the pure acoustic model of the listed phoneme by the listed phoneme's count in the mapping list. The function 3316 adds the resulting product to the blended acoustic phoneme model 3000A being generated for the given phoneme.

FIG. 34 is a simplified description of programming 342A for performing speech recognition directly against segregated acoustic models, rather than against non-segregatable blended models 3000A, of the type shown in FIG. 30 that are generated from such segregated models by the functions 3308 through 3316 of FIG. 33. This algorithm is identical to the speech-recognition algorithm 342 shown in FIG. 29 except for the capitalized word "SEGREGATED" contained in its modified function 2906A shown in FIG. 34.

Figure 35:
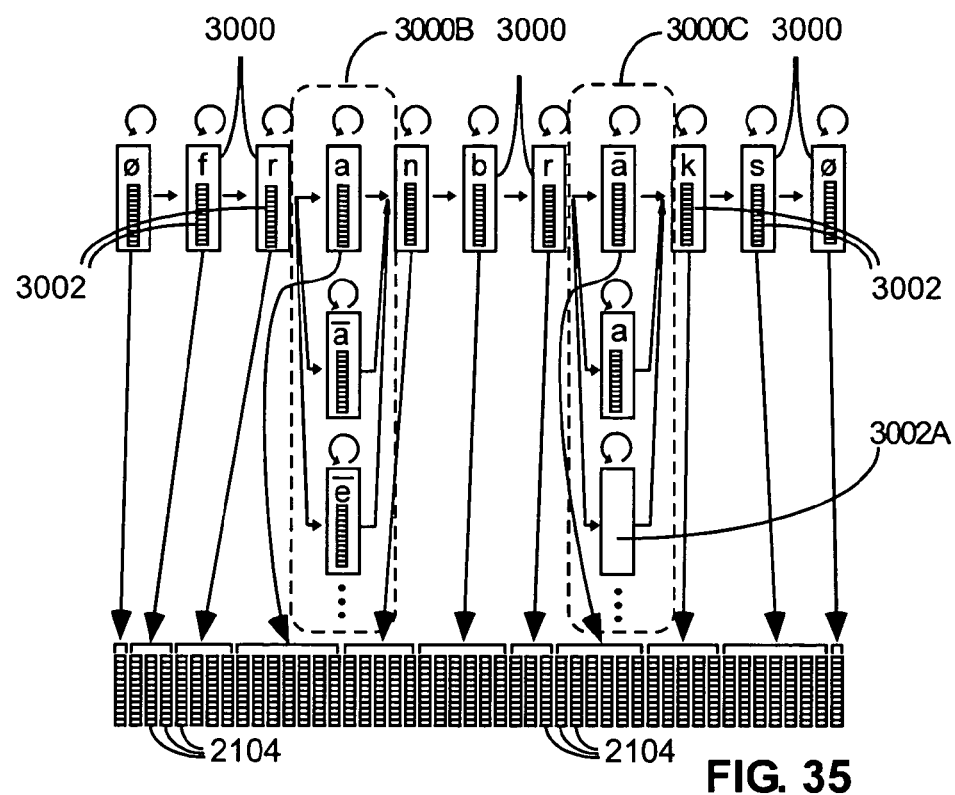
FIGS. 35 and 36 are schematic diagrams of speech-recognition against segregated acoustic models using the algorithm of FIG. 34.
Figure 36:
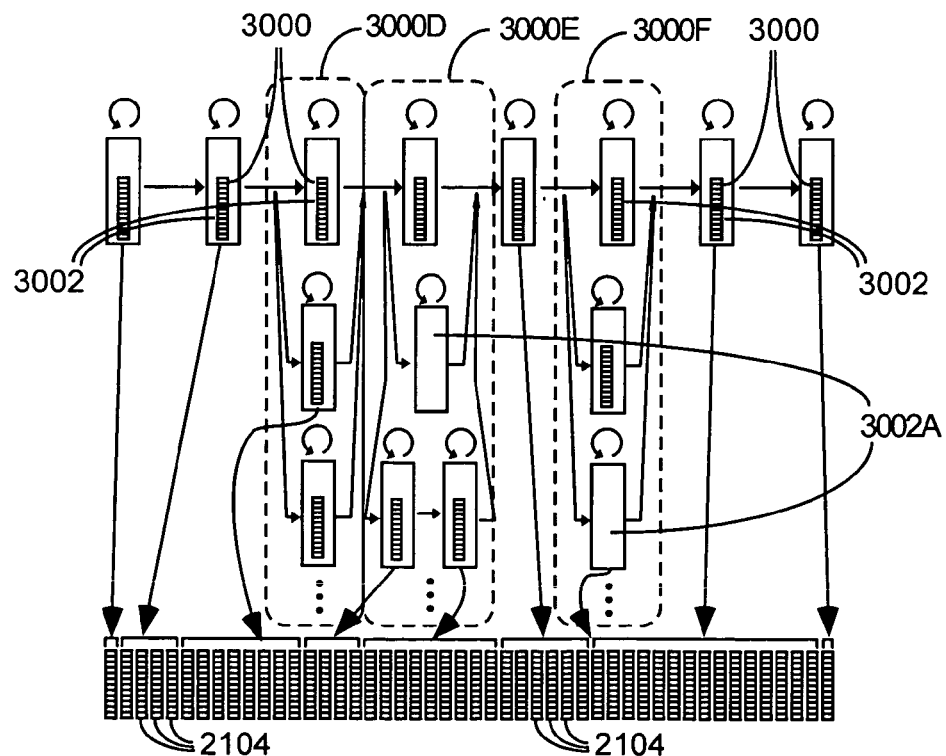

FIGS. 35 and 36 illustrate how a sequence of frames 2104 representing an utterance to be recognized can be matched against a sequence of segregated blended models 3000. In the example of these figures the segregated blended models are composed of one or more pure models 3002, and more than one pure model is only used if the count associated with that pure model, of the type illustrated in row 3008 in FIG. 30, is large enough to justify the additional computation required for its use. In FIGS. 35 and 36 the only segregated blended models where more than one pure model is used are the models 3000B, 3000C, 3000D, 3000E, and 3000F. Where a given blended phoneme is represented by a plurality of pure phonemes, the sequence of frames 2104 associated with an utterance being recognized can be mapped against any path through the sequence of pure phonetic models 3002 that can be traversed by following the small tipped arrows between such models shown in FIGS. 35 and 36. This is somewhat similar to the diverging and converging paths among acoustic phoneme models that frames are commonly compared against when performing continuous speech recognition.

The segregated blended model 3000E illustrates an example where a given phoneme gets mapped against two phonemes, which can occur, for example, in systems where certain diphthongs are represented as multiple phonemes rather than one phoneme.

In FIGS. 35 and 36 the empty pure phonemes nodes labeled 3002A correspond to instances where the phoneme being represented by a blended model, such as blended models 3000C, 3000E, and 3000F in FIGS. 35 and 36, is occasionally mistakenly placed in the phonetic spelling by the pronunciation guesser where no phoneme should occur in the correct phonetic spelling.

It should be understood that the foregoing description and drawings are given merely to explain and illustrate the invention and that the invention is not limited thereto except insofar as the interpretation of the appended claims are so limited. Those skilled in the art who have the disclosure before them will be able to make modifications and variations therein without departing from the scope of the invention.

For example, the broad functions described in the claims below, like virtually all computer functions, can be performed by many different programming and data structures, and by using different organization and sequencing. This is because programming is an extremely flexible art in which a given idea of any complexity, once understood by those skilled in the art, can be manifested in a virtually unlimited number of ways. For example, in the pseudocode used in several of the figures of this specification the order of functions could be varied in many instances in other embodiments of the invention. Similarly, as is well understood by those skilled in the computing arts, it is well known that virtually any function that can be performed by a combination of programmable computer and compatible programming can be performed by equivalent hardwired circuitry, and vice versa. In some of the claims that follow, references made to circuitry that has certain characteristics are often meant to cover both hardwired circuitry having the stated characteristics as well as a combination of programmable circuitry and memory circuitry storing programming that together have the same characteristics.

Those skilled in the art of speech recognition will appreciate that many embodiments of the invention will use aspects of speech recognition which are not shown in the specification above for purposes of simplicity. For example, in many embodiments the matching of the sounds of an utterance will be performed against word models that have been mapped into a lexical tree, of a type commonly used in speech recognition systems, to reduce computation during acoustic matching against multiple words whose phonetic spellings share a sequence of one or more initial phonemes.

It should be understood that aspects of the present invention are not limited to use on cellphones and can be used on virtually any type of speech recognition enabled computing device, including desktop computers, laptop computers, tablet computers, personal digital assistants, wristwatch phones, and virtually any other device in which speech recognition using pronunciation guessing is desired. But as has been described above, the invention is likely to be of most use on systems which have relatively limited memory because it is in such devices that relatively small pronunciation guessers having the highest error rates are most likely to be used.

The present invention is currently used with a discrete recognition system, but is benefits can be used with continuous recognition as well. It is currently used with a speaker independent speech recognition system in which each acoustic training word is spoken by as many as over a hundred different speakers, but it could be used in speaker dependent systems. In speaker independent systems that do not have adaptation, performance tends to be worse for speakers who have strong accents that cause their speech to differ considerably from common pronunciations. Nevertheless, the use of blended acoustic phoneme models still tends to be useful with a relatively small vocabulary of names. Adaptation can be used to improve recognition performance for such speakers. This can include either general adaptation of the system's acoustic models, such as that described above with regard to FIG. 33 or allowing the system to record user specific acoustic models for particular names that the system is having the most trouble recognizing.

In some embodiments of the invention the speech recognition system can use pure acoustic phoneme models when recognizing words for which it has known phonetic spellings and blended acoustic phoneme models when recognizing words having phonetic spellings guessed by an errorful pronunciation guesser.

The pronunciation guessers used with various aspects of the present invention need not be decision tree pronunciation guessers of the type described above, but could be any other type of pronunciation guesser known either now or in the future.

In some embodiments of the invention only a subset of the acoustic phoneme models will be blended models. This is because a majority of the benefit in recognition performance provided by the use of blended acoustic phoneme models is provided by the blending of a minority of phonemes. This is indicated by column 1402 of FIG. 14, which shows that a large majority of the total number of phonetic spelling errors are commonly caused by the occurrences of a relatively small number of phonemes.

It should also be understood that the aspects of the invention relating to the training of a pronunciation guesser with the weighted letter contexts can be used separately from aspects of the invention relating to the use of blended acoustic models, and vice versa.

The invention is not limited to use in voice dialing or the recognition of people's names. For example, one very good application for such recognition is in contexts in which a user enters a name into a speech recognition enabled computing device in association with a specific data item or functionality. This enables the user to select the data item or functionality by means of speech recognition. Although in some such situations the names used might be those associated with people, in others they could be names associated with corporate, nonprofit, or governmental entities; with names of songs, videos, images, documents, or speech recordings; as well as functions such as robotic functions and user-defined macros.

In addition, the invention could be used in conjunction with a pronunciation guesser intended for use in a general purpose continuous speech recognition system used, for example, in a personal digital assistant or a cellphone with text messaging capability. In addition to people's names, such a pronunciation guesser could be used to generate pronunciations for new non-name words added to such a recognizer's vocabulary.

Although the aspects of the invention relating to blended acoustic models probably provide the greatest benefit when used with the pronunciation guessing of potential words having highly irregular letter-to-phoneme mappings, such as names used for voice dialing in the US market, it can be useful in recognizing names commonly used in other nations as well. For example, embodiments of the invention has already been tested for use in conjunction with voice dialing in the Great Britain, French, and German markets. And it is expected to provide benefits in other markets.

The present invention can be used with pronunciation guessers that generate more than one phonetic spelling in association with certain text spellings, as well as those that generate only one phonetic spelling for word. For example, in alternate embodiments of the aspect of the invention relating to training a pronunciation guesser each end node of a decision tree 708, shown in FIG. 7, could have a set of weighted output phonemes associated with it, rather than the single output phoneme 712 shown in that figure. The set of output phonemes associated with each end node could correspond to the set of phonemes associated with the context set supplied to the end node when training of the decision tree. The weight associated with each such output phoneme could correspond to the number of letter contexts in the end node's context set that were associated with the output phoneme. In such embodiments, the pronunciation guesser could generate a set of phonetic spellings for a given text spelling, with the probability associated with each such spelling being determined as a function of the weights associated with each phoneme of that spelling.

In some embodiments of the invention the pronunciation guessers used might involve greater sophistication than those described with regard to FIGS. 4 through 11. This might include, for example, the ability to take into account which phonemes have been selected, or considered probable, for other positions in a phonetic spelling when selecting or calculating the probability of a phoneme for given position in that spelling. However, the inventors have found that the relatively simple type pronunciation guesser described above with regard to FIGS. 4 through 11 provides relatively good performance considering its small size and computational requirements.

What we claim is:

1. A method of training acoustic models for use in phonetically spelled word models comprising:
   using a training pronunciation guesser to generate a phonetic spelling, each including a sequence of phonemes, from the text spelling of each of a set of acoustic training words;
   mapping sequences of sound associated with utterances from each of multiple speakers of each of a plurality of the training words against the corresponding sequence of phonemes defined by the phonetic spelling associated with the training word by the pronunciation guesser; and
   for each of a plurality of said phonemes, using the sounds of the utterances from multiple speakers mapped against a given phoneme in one or more of said phonetic spellings to develop at least one multi-speaker acoustic phoneme model for the given phoneme;

further including using the multi-speaker acoustic phoneme models, or acoustic models derived from them, in speech recognition performed against acoustic word models of words, where the acoustic word model of a given word is composed of a sequence of the acoustic phoneme models corresponding to a phonetic spelling generated for the given word by a recognition pronunciation guesser; and wherein the recognition pronunciation guesser is sufficiently similar to the training pronunciation guesser that it would make a majority of the same phonetic spelling errors made by the training pronunciation guesser in the acoustic training words if it were to generate phonetic spellings for the set of acoustic training words.

2. A method as in claim 1 wherein 5% or more of the occurrences of vowel phonemes placed in the phonetic spellings of the acoustic training words by the training pronunciation guesser are phonetic spelling errors.

3. A method as in claim 1 wherein the recognition and acoustic training pronunciation guessers are the same pronunciation guesser.

4. A method as in claim 1 wherein the words whose guessed phonetic spellings are used in the speech recognition are peoples' names.

5. A method as in claim 4 wherein the speech recognition is used in telephone name dialing in which the speech recognition of a name is used to select a telephone number associated with that name that can be automatically dialed.

6. A method as in claim 5 wherein the speech recognition and name dialing are performed on a cellphone.

7. A method as in claim 6 further including:

storing on said cellphone, for each of a plurality of commands words used to control the cellphone, a phonetic spelling of the command that comes from a source more accurate than the recognition pronunciation guesser; and performing speech recognition on a given utterance by matching it against acoustic word models, each composed of a sequence of said acoustic phoneme models corresponding to one of said stored phonetic spellings of a command word; and responding to an indication by the speech recognition that the given utterance corresponds to the phonetic spelling of a given one of the command words by causing the cellphone to perform the given command.

8. A method as in claim 6 further including:

responding to the entry of a name by a user by having the recognition pronunciation guesser generate a phonetic spelling for the user-entered name; and using the phonetic spelling of the user-entered name in the speech recognition.

9. A method of training acoustic models for use in phonetically spelled word models comprising:

using a training pronunciation guesser to generate a phonetic spelling, each including a sequence of phonemes, from the text spelling of each of a set of acoustic training words;

mapping sequences of sound associated with utterances of each of the training words against the corresponding sequence of phonemes defined by the phonetic spelling associated with the training word by the pronunciation guesser; and for each of a plurality of said phonemes, using the sounds mapped against a given phoneme in one or more of said phonetic spellings to develop at least one acoustic phoneme model for the given phoneme;

wherein 5% or more of the occurrences of vowel phonemes placed in the phonetic spellings of the acoustic training words by the training pronunciation guesser are phonetic spelling errors further including using the acoustic phoneme models in speech recognition performed against acoustic word models of words, where the acoustic word model of a given word is composed of a sequence of the acoustic phoneme models corresponding to a phonetic spelling generated for the given word by a recognition pronunciation guesser; and wherein the recognition pronunciation guesser would make a majority of the same phonetic spelling errors made by the training pronunciation guesser in the acoustic training words if it were to generate phonetic spellings for the set of acoustic training words;

wherein the words whose guessed phonetic spellings are used in the speech recognition are peoples' names;

wherein the speech recognition is used in telephone name dialing in which the speech recognition of a name is used to select a telephone number associated with that name that can be automatically dialed; and wherein the speech recognition and name dialing are performed on a cellphone; and further including:

responding to the entry of a name by a user by having the recognition pronunciation guesser generate a phonetic spelling for the user-entered name; and using the phonetic spelling of the user-entered name in the speech recognition; and for each of a plurality of common names, testing if the phonetic spelling produced for the name by the recognition pronunciation guesser is correct; and for each of a plurality of said common names which are found not to have correct phonetic spellings generated for them by the recognition pronunciation guesser, storing on said cellphone a phonetic spelling of the name that comes from a source more accurate than the recognition pronunciation guesser; and wherein said responding to the entry of a name by a user includes:

checking to see if the name is one for which a phonetic spelling from the more accurate source has been stored;

if so, using the more accurate spelling as the phonetic spelling for the user entered word in speech recognition; and if not, using the recognition pronunciation guesser to generate the phonetic spelling of the word and using that generated spelling in speech recognition.

10. A method as in claim 1 further including training the training pronunciation guesser by:

obtaining the following data for each of a plurality of said pronunciation-guesser training words:

a textual spelling for the word, comprised of a sequence of letters;

a relatively reliable phonetic spelling for the word, comprised of a sequence of phonemes; and a measure of the frequency with which the word occurs; and using the data obtained for each of said pronunciation-guesser training words to train the pronunciation guesser, including:

for each pronunciation-guesser training word, mapping the sequence of letters of the training word's textual spelling against the sequence of phonemes of the relatively reliable phonetic spelling; and using the resulting letter-to-phoneme mappings to train the pronunciation guesser;

wherein the using of said letter-to-phoneme mappings includes varying the weight given to a given letter-to-phoneme mapping in the training of the pronunciation guesser as a function of the frequency measure of the word in which such a mapping occurs.

11. A method as in claim 10 wherein the ratio of the weight given to a letter-to-phoneme mapping relative to the frequency of the given word in which the mapping occurs decreases as the frequency of the given word increases.

12. A method as in claim 1 wherein a majority of said acoustic phoneme models are multiphone models, each of which represents the sound of a given phoneme when it occurs in a given phonetic spelling context defined by one or more phonemes occurring before or after the given phoneme in a phonetic spelling.

13. A method as in claim 1 wherein a majority of said acoustic phoneme models are monophone models in which a given acoustic model represents the sounds of a given phoneme in all the phonetic spelling contexts in which it can occur in said phonetic spellings.

14. A method as in claim 1 wherein the acoustic training words are English words.

15. A method as in claim 1 wherein the set of training words are a representative distribution of names from US phone books.

16. A method as in claim 15 wherein the training pronunciation guesser is sufficiently errorful that 5% or more of the occurrences of vowel phonemes the training pronunciation guesser would placed in the phonetic spellings of such a set of names, if generating their phonetic spellings, would be phonetic spelling errors.

17. A method of making a speech recognition enabled computing system comprising:
   training a set of acoustic phoneme models by:
      using a training pronunciation guesser to generate a phonetic spelling, each including a sequence of phonemes, from the text spelling of each of a set of acoustic training words;
      mapping sequences of sound from utterances of multiple of speakers against the sequence of phonemes defined by the phonetic spelling associated with training words by the pronunciation guesser; and
      for each of a plurality of said phonemes, using the sounds of the utterances from multiple speakers mapped against a given phoneme in one or more of said phonetic spellings to develop at least one multi-speaker acoustic phoneme model for the given phoneme; and
   storing in machine readable memory of the computing system being made the following:
      recognition pronunciation guessing programming for generating a phonetic spelling, comprised of a sequence of phonemes, from a textual spelling of a word;
      at least acoustic phoneme model for modeling the speech sounds associated with each phoneme used in the phonetic spellings generated by the recognition pronunciation guessing programming, including said multi-speaker acoustic phoneme models, or acoustic models derived from them;
      speech recognition programming for recognizing an utterance by scoring the match between a sequence of the utterance's speech sounds and a sequence of said acoustic phoneme models associated with the phonetic spelling of each of a plurality of words; and
      programming for enabling the speech recognition programming to perform recognition against a sequence of said acoustic phoneme models associated with a phonetic spelling generated by the pronunciation guessing programming;
   wherein:
      5% or more of the occurrences of vowel phonemes placed in the phonetic spellings of the acoustic training words by the training pronunciation guesser are phonetic spelling errors; and
      the recognition pronunciation guessing programming would make a majority of the same phonetic spelling errors as are made by the training pronunciation guesser when generating phonetic spellings for the acoustic training words.

18. A method as in claim 17 further including storing in said machine readable memory programming for:
   enabling a user to enter the text spelling of a name into the system in association with an item upon which the system can perform a given function;
   responding to such a user's entry of a name into the system by causing the pronunciation guessing programming to generate a phonetic spelling from the text spelling of the entered name;
   responding to a user's utterance by having the speech recognition programming score the match between the sound of the utterance and sequences of said acoustic phoneme models corresponding to the phonetic spellings generated by the pronunciation guessing programming for each of one or more user entered names; and
   determining whether to perform the given function on the item associated with a given user-entered name as a function of the score produced by the speech recognition programming for the utterance against the phonetic spelling of the given user-entered name.

19. A method as in claim 18 wherein:
the item associated with a user-entered name includes a phone number; and
the given function is the dialing of the phone number associated with a user-entered name selected as a function of the score produced by the speech recognition programming.

20. A method as in claim 19 wherein the system is a cellphone.

21. A method as in claim 18:
further including storing in said machine readable memory correct phonetic spellings for a plurality of names the recognition pronunciation guessing programming phonetically misspells; and
wherein said programming for responding to a user's entry of a name into the system includes programming for responding to the user's entry of a given name for which a correct phonetic spelling has been stored by causing said correct phonetic spelling to be used as the phonetic spelling for the given user-entered name in matching performed by the speech recognition programming instead of a phonetic spelling generated for the given name by said recognition pronunciation guessing programming.

22. A method as in claim 21 wherein said speech recognition programming uses the same acoustic phoneme models for a given phoneme in a given phonetic context in said correct phonetic spellings as it uses for the same phoneme in the same phonetic context in phonetic spellings generated by the pronunciation guessing programming.

23. A method as in claim 18 further including storing in said machine readable memory:

a correct phonetic spelling for each of a plurality of commands;

command recognition programming for causing the speech recognition programming to perform recognition of utterances against sequences of said acoustic phoneme models corresponding to the stored correct phonetic spellings of said commands; and programming for determining whether to perform a given command as a function of the score produced by the speech recognition programming of a given utterance against the correct phonetic spelling of the given command.

24. A speech recognition system comprising:

machine readable memory storing;

pronunciation guessing programming for generating a phonetic spelling, comprised of a sequence of phonemes, from a textual spelling of a word;

a set of acoustic phoneme models, including at least one for modeling the speech sounds associated with each phoneme used in the phonetic spellings generated by the pronunciation guessing programming, where each of a plurality of said acoustic phoneme models are multi-speaker models that each have been derived from utterances made by multiple speaker, or acoustic models that have been adapted from such multi-speaker models;

speech recognition programming for recognizing an utterance by scoring the match between a sequence of the utterance's speech sounds and a sequence of said acoustic phoneme models associated with the phonetic spelling of each of a plurality of word models; and programming for enabling the speech recognition programming to perform recognition against phonetic spellings generated by the pronunciation guessing programming;

wherein:

each of said acoustic models represents a phoneme in phonetic context;

each of a plurality of said acoustic models is a blended acoustic model that represents a given phoneme in a given phonetic context as a distribution of sounds corresponding to utterances of the given phoneme and utterances of an associated set of one or more other phonemes, where both the sounds corresponding to the utterances of the given phoneme and to utterances of one or more associated phonemes have each been derived from the utterances of multiple speakers; and over the plurality of blended acoustic models, the relative weight allocated, in a given acoustic model representing a given phoneme in a given phonetic context, between sounds of utterances of the given phoneme and sounds of utterances of a specific one of the given phoneme's associated set of phonemes is correlated with the frequency with which the pronunciation guessing programming places the given phoneme in a position in a phonetic spelling in the given phonetic context where the correct phoneme for the position is said specific associated phoneme.

25. A system as in claim 24 wherein said machine readable memory further stores programming for:

enabling a user to enter the textual spelling of a word into the system;

responding to such a user's entry of a word into the system by causing the pronunciation guessing programming to generate a phonetic spelling from the textual spelling of the entered word; and responding to a user's utterance by having the speech recognition programming score the match between the sound of the utterance and sequences of acoustic phoneme models corresponding to the phonetic spellings generated by the pronunciation guessing programming for each of one or more user entered words.

26. A system as in claim 25 wherein:

said machine readable memory further stores correct phonetic spellings for a plurality of words the pronunciation guessing programming phonetically misspells; and said responding to a user's entry of a word into the system includes responding to the user's entry of a given word for which a correct phonetic spelling has been stored by causing said correct phonetic spelling to be used as the phonetic spelling that is used, in conjunction with said acoustic phoneme models, to represent the given user-entered word in the matching performed by the speech recognition programming instead of a phonetic spelling generated for the given name by said recognition pronunciation guessing programming.

27. A method as in claim 26 wherein said speech recognition programming uses the same blended acoustic phoneme models for a given phoneme in a given phonetic context in said correct phonetic spellings as it uses for the same phoneme in the same phonetic context in phonetic spellings generated by the pronunciation guessing programming.

28. A system as in claim 25 wherein said machine readable memory further stores:

a correct phonetic spelling for each of a plurality of commands;

command recognition programming for causing the speech recognition programming to perform recognition of utterances against sequences of said acoustic phoneme models, including said blended acoustic phoneme models, corresponding to the stored correct phonetic spellings of said commands; and programming for determining whether to perform a given command as a function of the score produced by the speech recognition programming of a given utterance against the correct phonetic spelling of the given command.

29. A speech recognition system comprising:

a pronunciation guesser for generating a phonetic spelling, comprised of a sequence of phonemes, from a textual spelling of a word;

machine readable memory storing a set of acoustic phoneme models, including at least one for modeling the speech sounds associated with each phoneme used in the phonetic spellings generated by the pronunciation guesser, where each of a plurality of said acoustic phoneme models are multi-speaker models that each have been derived from utterances made by multiple speaker, or acoustic models that have been adapted from such multi-speaker models;

a speech recognizer for recognizing an utterance by scoring the match between a sequence of the utterance's speech sounds and a sequence of said acoustic phoneme models associated with the phonetic spelling of each of a plurality of word models; and circuitry for enabling the speech recognizer to perform recognition against phonetic spellings generated by the pronunciation guesser;

wherein:

each of said acoustic models represents a phoneme in a phonetic context;

each of a plurality of said acoustic models is a blended acoustic model that represents a given phoneme in a given phonetic context as a distribution of sounds corresponding to utterances of the given phoneme and utterances of an associated set of one or more other phonemes, where both the sounds corresponding to the utterances of the given phoneme and to utterances of one or more associated phonemes have each been derived from the utterances of multiple speakers; and over the plurality of blended acoustic models, the relative weight allocated, in a given acoustic model representing a given phoneme in a given phonetic context, between sounds of utterances of the given phoneme and sounds of utterances of a specific one of the given phoneme's associated set of phonemes is correlated with the frequency with which the pronunciation guesser places the given phoneme in a position in a phonetic spelling in the given phonetic context where the correct phoneme for the position is said specific associated phoneme.

30. A system as in claim 29 further including circuitry for:
enabling a user to enter the textual spelling of a word into the system;
responding to a user's entry of a word into the system by causing the pronunciation guesser to generate a phonetic spelling from the textual spelling of the entered word; and
responding to a user's utterance by having the speech recognizer score the match between the sound of the utterance and sequences of acoustic models corresponding to the phonetic spellings generated by the pronunciation guessing programming for each of one or more user entered words.

31. A system as in claim 30 wherein:
said machine readable memory further stores correct phonetic spellings for a plurality of words the pronunciation guesser phonetically misspell; and
said responding to a user's entry of a word into the system responds to the user's entry of a given word for which a correct phonetic spelling has been stored by causing said correct phonetic spelling to be used as the phonetic spelling for the given user-entered word in the matching performed by the speech recognizer.

32. A method as in claim 31 wherein said speech recognizer uses the same blended acoustic phoneme models for a given phoneme in a given phonetic context in said correct phonetic spellings as it uses for the same phoneme in the same phonetic context in phonetic spellings generated by the pronunciation guesser.

33. A system as in claim 30:
wherein said machine readable memory further stores a correct phonetic spelling for each of a plurality of commands; and
said system further includes:
command recognition circuitry for causing the speech recognizer to perform recognition of utterances against sequences of said acoustic phoneme models corresponding to the stored correct phonetic spellings of said commands; and
circuitry for determining whether to perform a given command as a function of the score produced by the speech recognizer for a given utterance against the correct phonetic spelling of the given command;
wherein said speech recognizer uses the same blended acoustic phoneme models for a given phoneme in a given phonetic context in said correct command phonetic spellings as it uses for the same phoneme in the same phonetic context in phonetic spellings generated by the pronunciation guesser.

34. A system as in claim 29 wherein:
the pronunciation guesser is such that it would produce phonetic spellings in which 5% or more of the individual occurrences of vowel phonemes are phonetic misspellings when generating the phonetic spellings of a given vocabulary for which the pronunciation guesser has been trained to generated phonetic spellings;
each of said acoustic models represents a phoneme in a phonetic context;
each of a set of said acoustic models, including at least one acoustic model for each of a plurality of the vowel phonemes used by the pronunciation guesser, is a blended acoustic model that represents a given phoneme in a given phonetic context as a distribution of sounds corresponding to utterances of the given phoneme and utterances of an associated set of one or more other phonemes; and
over the plurality of blended acoustic models, the relative weight allocated, in a given acoustic model representing a given phoneme in a given phonetic context, between sounds of utterances of the given phoneme and each of the given phoneme's associated phonemes is correlated with the frequency with which the pronunciation guesser would place, when generating phonetic spelling for the given vocabulary, the given phoneme in a position in a phonetic spelling within the given phonetic context where the correct phoneme for the position is, respectively, the given phoneme and each of said associated phonemes.

35. A speech recognition system comprising:
machine readable memory storing;
pronunciation guessing programming for generating a phonetic spelling, comprised of a sequence of phonemes, from a textual spelling of a word;
a set of acoustic phoneme models, including at least one for modeling the speech sounds associated with each phoneme used in the phonetic spellings generated by the pronunciation guessing programming, where each of a plurality of said acoustic phoneme models are multi-speaker models that each have been derived from utterances made by multiple speaker, or acoustic models that have been adapted from such multi-speaker models;
speech recognition programming for recognizing an utterance by scoring the match between a sequence of the utterance's speech sounds and a sequence of said acoustic phoneme models associated with the phonetic spelling of each of a plurality of word models; and
programming for enabling the speech recognition programming to perform recognition against phonetic spellings generated by the pronunciation guessing programming;
wherein:
the pronunciation guessing programming would produce phonetic spellings in which 5% or more of the individual occurrences of vowel phonemes are phonetic misspellings when generating the phonetic spellings of a given vocabulary for which the pronunciation guesser has been trained to generated phonetic spellings;
each of said acoustic models represents a phoneme in a phonetic context;
each of a plurality of said acoustic models, including at least one acoustic model for at least a plurality of vowel phonemes used by the pronunciation guessing programming, is a blended acoustic model that represents a given phoneme in a given phonetic context as a distribution of sounds corresponding to utterances of the given phoneme and utterances of an associated set of one or more other phonemes, where both the sounds corresponding to the utterances of the given phoneme and to utterances of one or more associated phonemes have each been derived from the utterances of multiple speakers; and over the plurality of blended acoustic models, the relative weight allocated, in a given acoustic model representing a given phoneme in a given phonetic context, between sounds of utterances of the given phoneme and sounds of utterances of a specific one of the given phoneme's associated set of phonemes is correlated with the frequency with which the pronunciation guessing programming would place, when generating phonetic spelling for the given vocabulary, the given phoneme in a position in a phonetic spelling within the given phonetic context where the correct phoneme for the position is said specific associated phoneme.

36. A speech recognition system as in claim 35 wherein a majority of said blended acoustic models are multiphone models, each of which represents the sound of a given phoneme when it occurs in a given phonetic spelling context defined by one or more phonemes occurring before or after the given phoneme in a phonetic spelling.

37. A speech recognition system as in claim 35 wherein a majority of said blended acoustic models are non-multiphone models in which a given acoustic model represents the sounds of a given phoneme in all the phonetic spelling contexts in which it can occur in said phonetic spellings.

38. A system as in claim 35 wherein said machine readable memory further stores programming for:

enabling a user to enter the text spelling of a name into the system in association with an item upon which the system can perform a given function;

responding to such a user's entry of a name into the system by causing the pronunciation guessing programming to generate a phonetic spelling from the text spelling of the entered name;

responding to a user's utterance by having the speech recognition programming score the match between the sound of the utterance and sequences of said acoustic phoneme models corresponding to the phonetic spellings generated by the pronunciation guessing programming for each of one or more user entered names; and determining whether to perform the given function on the item associated with a given user-entered name as a function of the score produced by the speech recognition programming for the utterance against the given user-entered name.

39. A system as in claim 38 wherein a user-entered name is a person's name.

40. A system as in claim 38 wherein:

the item associated with a user-entered name includes a phone number; and the given function is the dialing of the phone number associated with the user-entered name selected by the speech recognition programming.

41. A system as in claim 40 wherein the system is a cellphone.

42. A system comprising:

machine readable memory storing:

pronunciation guessing programming for generating a phonetic spelling, comprised of a sequence of phonemes, from a textual spelling of a word;

a set of acoustic phoneme models, including at least one for modeling the speech sounds associated with each phoneme used in the phonetic spellings generated by the pronunciation guessing programming;

speech recognition programming for recognizing an utterance by scoring the match between a sequence of the utterance's speech sounds and a sequence of said acoustic phoneme models associated with the phonetic spelling of each of a plurality of word models; and programming for enabling the speech recognition programming to perform recognition against phonetic spellings generated by the pronunciation guessing programming;

wherein:

the pronunciation guessing programming would produce phonetic spellings in which 5% or more of the individual occurrences of vowel phonemes are phonetic misspellings when generating the phonetic spellings of a given vocabulary for which the pronunciation guesser has been trained to generated phonetic spellings;

each of said acoustic models represents a phoneme in a phonetic context;

each of a plurality of said acoustic models, including at least one acoustic model for at least a plurality of vowel phonemes used by the pronunciation guessing programming, is a blended acoustic model that represents a given phoneme in a given phonetic context as a distribution of sounds corresponding to utterances of the given phoneme and utterances of an associated set of one or more other phonemes; and over the plurality of blended acoustic models, the relative weight allocated, in a given acoustic model representing a given phoneme in a given phonetic context, between sounds of utterances of the given phoneme and each of the given phoneme's associated phonemes is correlated with the frequency with which the pronunciation guessing programming would place, when generating phonetic spelling for the given vocabulary, the given phoneme in a position in a phonetic spelling within the given phonetic context where the correct phoneme for the position is, respectively, the given phoneme and each of said associated phonemes;

wherein said machine readable memory further stores programming for:

enabling a user to enter the text spelling of a name into the system in association with an item upon which the system can perform a given function;

responding to such a user's entry of a name into the system by causing the pronunciation guessing programming to generate a phonetic spelling from the text spelling of the entered name;

responding to a user's utterance by having the speech recognition programming score the match between the sound of the utterance and sequences of said acoustic phoneme models corresponding to the phonetic spellings generated by the pronunciation guessing programming for each of one or more user entered names; and determining whether to perform the given function on the item associated with a given user-entered name as a function of the score produced by the speech recognition programming for the utterance against the given user-entered name; and wherein:—said machine readable memory further stores correct phonetic spellings for a plurality of names the pronunciation guessing programming phonetically misspell; and said responding to a user's entry of a name into the system responds to the user's entry of a given name for which a correct phonetic spelling has been stored by causing said correct phonetic spelling to be used as the phonetic spelling for the given user-entered name in the matching performed by the speech recognition programming.

43. A method as in claim 42 wherein said speech recognition programming uses the same blended acoustic phoneme models for a given phoneme in a given phonetic context in said correct phonetic spellings as it uses for the same phoneme in the same phonetic context in phonetic spellings generated by the pronunciation guessing programming.

44. A system as in claim 38 wherein said machine readable memory further stores:

a correct phonetic spelling for each of a plurality of commands;

command recognition programming for causing the speech recognition programming to perform recognition of utterances against sequences of said acoustic phoneme models, including said blended acoustic phoneme models, corresponding to the stored correct phonetic spellings of said commands; and programming for determining whether to perform a given command as a function of the score produced by the speech recognition programming of a given utterance against the correct phonetic spelling of the given command.

45. A system as in claim 35 wherein a blended acoustic phoneme model representing a given phoneme in a given phonetic context does so without representing which portions of the model's blended distribution of speech sounds are associated with the given phoneme and which are associated with one or more of the given phoneme's associated phonemes.

46. A system as in claim 35 wherein said machine readable memory further stores:

a pure acoustic phoneme model associated with each of a plurality of phonemes, each of which represents the sound of a given phoneme in a phonetic context with less blending from other phonemes than a corresponding blended acoustic phoneme model for the phoneme;

for each of said blended acoustic phoneme models, a representation of the relative blending weights to be given to the model's given phoneme and to each of the given phoneme's associated phonemes in the blended acoustic model; and programming for creating, for each given one of a plurality of blended acoustic phoneme models, a representation for use by the speech recognition programming of the blend between the model's given phoneme and the given phoneme's associated phonemes from a combination of the pure acoustic phoneme models corresponding to the given phoneme and the given phoneme's associated phonemes, based on the representation of relative blending weights stored for the given blended acoustic model.

47. A system as in claim 46 wherein said programming for creating said blended a representation for use by the speech recognition programming of the blended acoustic phoneme model of a given phoneme creates the blended representation of the speech sounds associated with utterances of the given phoneme and the given phoneme's associated phonemes that does not separately represent which portions of the blended distribution of speech sounds are associated with the given phoneme and which portions are associated with one or more of the given phoneme's associated phonemes.

48. A system as in claim 46 wherein said programming for creating said blended a representation for use by the speech recognition programming of a given blended acoustic phoneme model of a given phoneme does so by causing the speech recognition programming to compare the portion of an utterance that is mapped against the given blended acoustic phoneme model in a given phonetic spelling against the pure acoustic phoneme models of the given phoneme and the given phoneme's associated phonemes.

49. A system as in claim 48 wherein the score of the match against pure models of the given phoneme and the given phoneme's associated phonemes is a function not only of the degree of match against the pure model of such phonemes, but also of the relative blending weights stored in association with each of those phonemes.

50. A system as in claim 46 wherein said machine readable memory further stores programming for responding to one or more training utterances of words by a user of the system by:

mapping the sounds of said one or more training utterances against word models, where each such word model includes a correct phonetic spelling and a sequence of the one or more pure acoustic phoneme models associated with said phonetic spelling;

altering each pure acoustic phoneme models against which a portion of one or more utterances is mapped to better represent the training utterance sounds mapping against the pure acoustic phoneme model; and causing the programming for creating the representation of the blend between a blended acoustic phoneme model's given phoneme and the given phoneme's associated phonemes to create such a blended representation from a combination of pure acoustic phoneme models that have been altered in response to said training utterances.

\* \* \* \* \*